(12) United States Patent
Vasko et al.

(10) Patent No.: US 12,090,709 B1
(45) Date of Patent: Sep. 17, 2024

(54) APPARATUS AND A METHOD FOR TARGETED ULTRASONIC MELT-FORMING OR STAKING

(71) Applicant: Dukane IAS, LLC, St. Charles, IL (US)

(72) Inventors: Petr Vasko, Velke Prilepy (CZ); Robert Aldaz, St Charles, IL (US); Leo Klinstein, Glenview, IL (US)

(73) Assignee: DUKANE IAS, LLC, St. Charles, IL (US)

( * ) Notice: Subject to any disclaimer, the term of this patent is extended or adjusted under 35 U.S.C. 154(b) by 0 days.

(21) Appl. No.: 18/489,497

(22) Filed: Oct. 18, 2023

(51) Int. Cl.
*B29C 65/60* (2006.01)
*B29C 65/00* (2006.01)
*B29C 65/08* (2006.01)

(52) U.S. Cl.
CPC ............ *B29C 65/606* (2013.01); *B29C 65/08* (2013.01); *B29C 66/951* (2013.01)

(58) Field of Classification Search
None
See application file for complete search history.

(56) References Cited

U.S. PATENT DOCUMENTS

| 5,658,408 A | 8/1997 | Frantz et al. |
| 6,329,629 B1 * | 12/2001 | Grewell .................. B29C 65/16 |
| | | 264/479 |
| 10,710,311 B1 | 7/2020 | Vasko et al. |
| 11,027,498 B2 | 6/2021 | Li et al. |

* cited by examiner

*Primary Examiner* — Jacob T Minskey
*Assistant Examiner* — Adrianna N Konves
(74) *Attorney, Agent, or Firm* — Ice Miller LLP; Justin D. Swindells

(57) ABSTRACT

A method and an apparatus for ultrasonic staking a first part having a fastening portion to a second part having an opening corresponding to the fastening portion. The method comprises aligning the fastening portion of the first part with the corresponding opening in the second part, inserting a head of the fastening portion through the corresponding opening, and causing a horn of an ultrasonic staking stack to contact the head, apply ultrasonic energy oscillating at a frequency between 45 kHz and 75 kHz, and move along an axis of the fastening portion as the head melts to form a stake. The stake can include a melt-form that joins the first part and the second part to each other, and the fastening portion can have a geometry or a size disposed to flapping.

20 Claims, 17 Drawing Sheets

APPARATUS AND A METHOD FOR TARGETED ULTRASONIC MELT-FORMING OR STAKING

FIELD OF THE INVENTION

The present invention relates generally to ultrasonic melt-forming and, more particularly, to an apparatus and a method for ultrasonic melt-forming or staking of targeted portions of structures used to fasten or secure two or more parts to each other, such as, for example, but not limited to, a boss, a gusset, a tab, a rib, an insert, or the like.

BACKGROUND OF THE INVENTION

Ultrasonic transducers are devices that convert energy into sound, typically in the nature of ultrasonic vibrations-sound waves that have a frequency above the normal range of human hearing. One of the most common types of ultrasonic transducers in modern use is the piezoelectric ultrasonic transducer which converts electric voltage signals into mechanical vibrations. Piezoelectric materials are traditionally crystalline structures and ceramics that produce a voltage in response to the application of a mechanical stress. Since this effect also applies in the reverse, a voltage applied across a sample piezoelectric material will produce a mechanical stress within the material. Suitably designed structures made from these materials can therefore be made that bend, expand, or contract when an electric voltage is applied thereto.

Many ultrasonic transducers are tuned structures that contain piezoelectric ("piezo") ceramic rings. The piezo ceramic rings are typically made of a material, such as lead zirconium titanate ceramic (more commonly referred to as "PZT"), that has a proportional relationship between an applied voltage and a mechanical strain (for example, thickness) of the ring. The supplied electrical signal is typically provided at a frequency that matches the resonant frequency of the ultrasonic transducer. In reaction to this electrical signal, the piezo ceramic rings expand and contract to produce large-amplitude vibrational motion. For example, a 20 kHz ultrasonic transducer typically produces 20 microns of vibrational peak-to-peak (p-p) amplitude. The electrical signals are often provided as a sine wave by a power supply that regulates the signal to produce consistent amplitude mechanical vibrations and protect the mechanical structure against excessive strain or abrupt changes in amplitude or frequency.

Typically, the ultrasonic transducer is connected to an ultrasonic booster and a sonotrode, which is commonly called a "horn" in the ultrasonic welding industry. The ultrasonic booster and sonotrode are normally tuned to have a resonant frequency that matches that of the ultrasonic transducer. The ultrasonic booster, which is structured to permit mounting of the ultrasonic transducer assembly, or "stack" as it is commonly called, is typically a tuned half-wave component that is configured to increase or decrease the vibrational amplitude passed between the converter (transducer) and sonotrode (horn). The amount of increase or decrease in amplitude is referred to as "gain." The horn, which is oftentimes a tapering metal bar, is structured to augment the oscillation displacement amplitude provided by the ultrasonic transducer and thereby increase or decrease the ultrasonic vibration and distribute it across a desired work area.

The mechanical components used in an ultrasonic transducer assembly are typically structured to operate at a single resonant frequency that is near or at a desired operating frequency. In addition, the ultrasonic transducer assembly must often operate with a vibrational motion that is parallel to a primary axis of the assembly, such as, for example, a central longitudinal axis of the assembly. The power supply for the stack generally operates as part of a closed-loop feedback system that monitors and regulates the applied voltage and frequency.

For certain applications, particularly those involving welding of thermoplastic parts together, ultrasonic welding technology is highly desirable due to its consistency (particularly when the stack's movement is controlled by a servo-driven motor), speed, weld quality, and other advantages. State-of-the-art ultrasonic welding equipment is typically operated at frequencies between 20 kHz and 40 KHz.

U.S. Pat. No. 5,658,408 to Jeffrey L. Frantz, et al., issued on Aug. 19, 1997, describes a method of welding two thermoplastic workpieces together using, preferably, a frequency between about 20 kHz and 40 kHz, and U.S. Pat. No. 11,027,498 to Yongqiang Li, et al., issued on Jun. 8, 2021, describes ultrasonic welding of dissimilar sheet materials using a frequency between 15 kHz and 30 kHz.

The inventors have discovered that a phenomenon such as "resonance disaster" can occur when operating ultrasonic welding equipment at commonly used frequencies, such as 20 kHz, 30 kHz, 35 kHz, or 40 kHz, for thermoplastic melt-forming or staking fastening portions having certain sizes or geometries that are prone or disposed to flapping when vibrating at a resonant frequency ("flap-prone structures"). The source of such flapping is the existence of multiple natural resonances in the 20 to 40 kHz range due to the size of the fastening structures commonly used in industry. In particular, the inventors have discovered that, while frequencies of 20/30/35/40 kHz are adequate for staking cylindrical-shaped hollow fastening portions, resonance disaster occurs when applying such frequencies to flap-prone structures in thermoplastic melt-forming or staking, such as used to mechanically fasten multiple parts to each other—for example, much like a rivet that is commonly used to fasten structures to each other. The resonance disaster can include breakage, thinning or other deformation to the shape, size or material of the fastening portion or part.

The inventors discovered that operating ultrasonic welding equipment at frequencies of 40 kHz or less on fastening portions having flap-prone structures results in resonance destruction such as unwanted heat distribution in the fastening portions and other sections of the parts (i.e., other than a targeted melt area of a fastening portion), destructive flapping of the fastening portions, and breakage of the fastening portion and/or part. Melt-formations or staking produced by these methods produced undesirable resonance disaster in fastening portions having flap-prone structures, resulting in destruction of the fastening portions and unwanted decoupling of the parts that were meant to be affixed to each other via such fastening portions. As the size increases, or the geometry of the fastening portion becomes more flap-prone (for example, susceptible to resonance), the resonance disaster becomes increasingly pronounced and unacceptable.

A need exists, therefore, for a solution to this resonance disaster problem. Aspects of the present disclosure are directed to fulfilling this need by eliminating resonance disaster in ultrasonic melt-forming or staking, such as, for example, in thermoplastic staking of flap-prone fastening portions used to join two or more parts together.

SUMMARY OF THE INVENTION

According to an aspect of the disclosure, a method is provided for ultrasonic staking a first part having a fastening portion to a second part having an opening corresponding to the fastening portion. The method comprises: aligning the fastening portion of the first part with the corresponding opening in the second part; inserting a head of the fastening portion through the corresponding opening; and causing a horn of an ultrasonic staking stack to contact the head, apply ultrasonic energy oscillating at a frequency between 45 kHz and 75 kHz, and move along an axis of the fastening portion as the head melts to form a stake. In at least one embodiment, the stake comprises a melt-form that joins the first part and the second part to each other, and wherein the fastening portion has a geometry or a size disposed to flapping.

In the method, inserting the head of the fastening potion through the corresponding opening can comprise protruding the head of the fastening portion beyond a surface of the second part, and the applied ultrasonic energy can be oscillating at the frequency of 50 kHz;

The method can further comprise, while causing the horn to apply the ultrasonic energy oscillating at the frequency of 50 kHz, simultaneously causing the horn to move along the axis of the fastening portion as the head melts.

In the method: the size can be a collapse length of between about 8 mm and about 25 mm, and preferably between about 8 mm and about 15 mm; and/or the fastening portion can have a plurality of natural resonance frequencies of 40 kHz, or less; and/or the geometry can include a base of the fastening portion that connects to the first part and has a first cross-section area that is substantially rectangular or trapezoidal in shape; and/or the geometry can include a head of the fastening portion that has a second cross-section area smaller than said first cross-section area; and/or the melt-form can comprise a mushroom shape, wherein the mushroom shape can have a cross-section area that is substantially rectangular or trapezoidal in shape.

According to a further aspect of the disclosure, a non-transitory computer-readable medium is provided for ultrasonic staking a first part having a fastening portion to a second part having an opening corresponding to the fastening portion, the computer-readable medium comprising instructions that, when executed by a processor, cause the processor to perform a method comprising: aligning the fastening portion of the first part with the corresponding opening in the second part; inserting a head of the fastening portion through the corresponding opening; and causing a horn of an ultrasonic staking stack to contact the head, apply ultrasonic energy oscillating at a frequency between 45 kHz and 75 kHz, and move along an axis of the fastening portion as the head melts to form a stake, wherein the stake comprises a melt-form that joins the first part and the second part to each other, and wherein the fastening portion has a geometry or a size disposed to flapping, applied ultrasonic energy can be oscillating at the frequency of 50 kHz. The method can comprise, while causing the horn to apply the ultrasonic energy oscillating at the frequency of 50 kHz, simultaneously causing the horn to move along the axis of the fastening portion as the head melts. The fastening portion can have a plurality of resonance frequencies of 40 kHz, or less. The geometry can include a base of the fastening portion that connects to the first part and has a first cross-section area that is substantially rectangular or trapezoidal in shape. The geometry can include a head of the fastening portion that has a second cross-section area smaller than said first cross-section area. The melt-form can comprise a mushroom shape having a cross-section area that is substantially rectangular or trapezoidal in shape.

According to a further aspect of the disclosure, a system is provided for ultrasonic staking a first part having a fastening portion to a second part having an opening corresponding to the fastening portion, the system comprising: a horn configured to apply ultrasonic energy at a predetermined frequency; and a controller configured to operate the horn, including to (i) position the horn to contact a head of the fastening portion, (ii) apply ultrasonic energy oscillating to the horn at a frequency between 45 kHz and 75 kHz, and (iii) move the horn along an axis of the fastening portion as the head melts to form a stake, wherein the stake comprises a melt-form that joins the first part and the second part to each other, and wherein the fastening portion has a geometry or a size disposed to flapping.

In the system, the fastening portion can have a natural resonance frequencies of 40 kHz, or less, and wherein the applied ultrasonic energy is oscillating at the frequency of 50 kHz. In at least one embodiment, the processor, while causing the horn to apply the ultrasonic energy oscillating at the frequency of 50 kHz, can simultaneously cause the horn to move along the axis of the fastening portion as the head melts.

Additional features, advantages, and embodiments of the disclosure may be set forth or apparent from consideration of the detailed description and drawings. Moreover, it is to be understood that the foregoing summary of the disclosure and the following detailed description and drawings provide nonlimiting examples that are intended to provide further explanation without limiting the scope of the disclosure as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention.

Figure 1A:
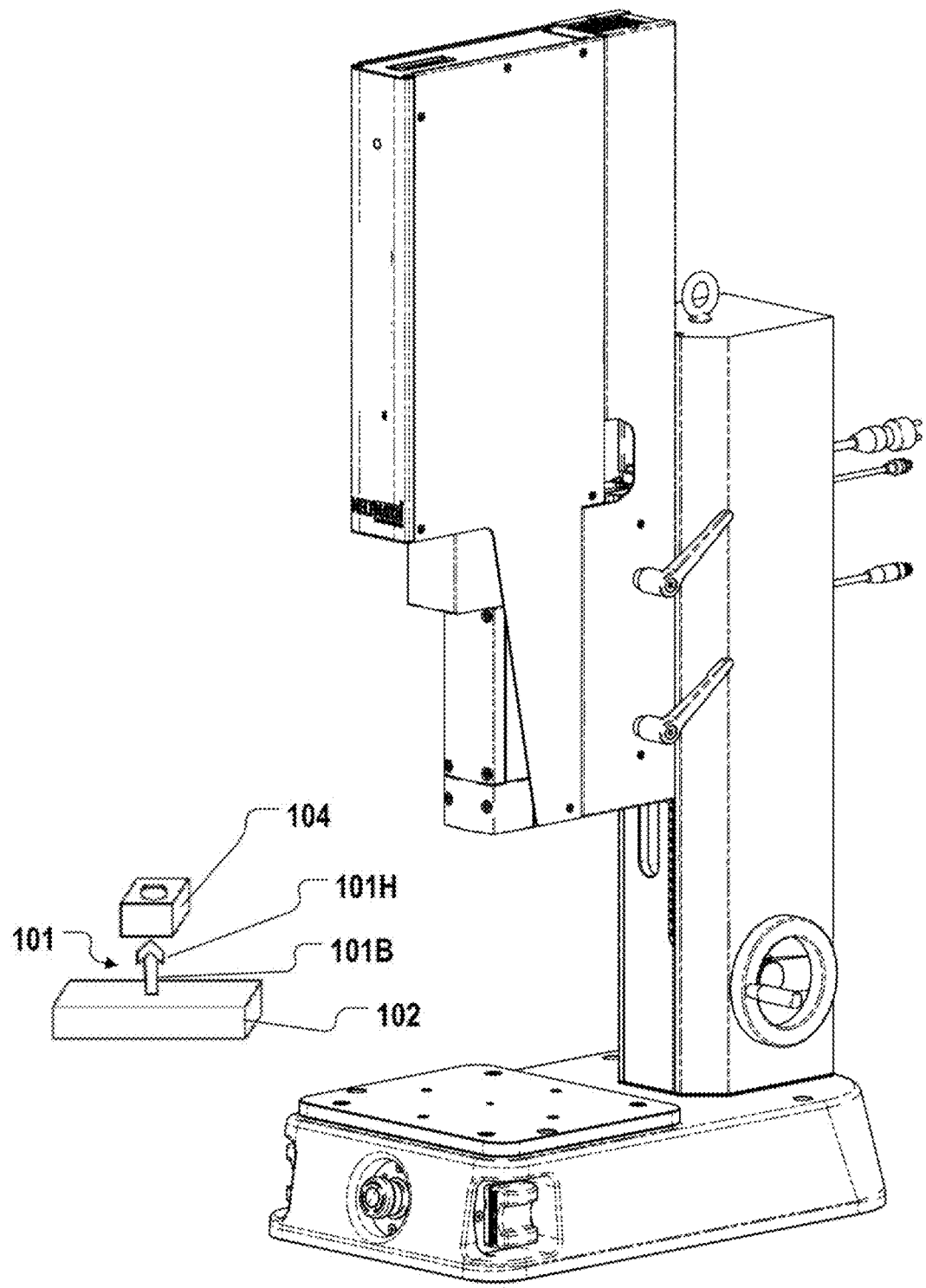
FIGS. 1A and 1B illustrate a nonlimiting embodiment of an ultrasonic staking system.

The present disclosure is further described in the detailed description that follows.

DETAILED DESCRIPTION OF THE INVENTION

The invention and its various features and advantageous details are explained more fully with reference to the non-limiting embodiments and examples that are described or illustrated in the accompanying drawings and detailed in the following description. It is noted that features illustrated in the drawings are not necessarily drawn to scale, and features of one embodiment can be employed with other embodiments, as those skilled in the art will recognize, even if not explicitly stated. Descriptions of well-known components and processing techniques may have been omitted so as to not unnecessarily obscure the embodiments of the invention. The examples are intended merely to facilitate an understanding of ways in which the invention can be practiced, and to further enable those skilled in the art to practice the embodiments of the invention. Accordingly, the examples and embodiments should not be construed as limiting the scope of the invention. Moreover, it is noted that like reference numerals represent similar parts throughout the several views of the drawings.

Figure 1B:
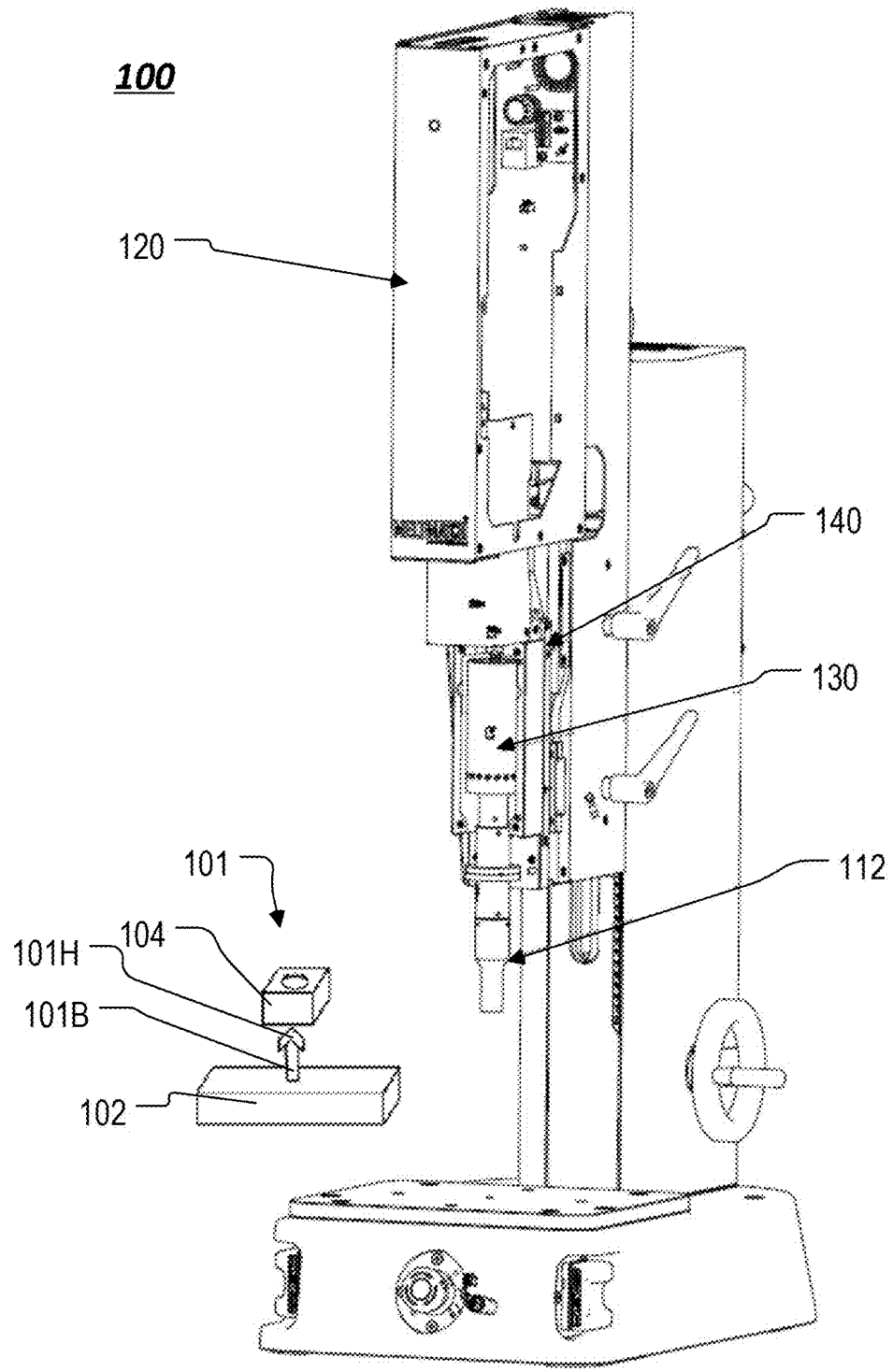

FIGS. 1A and 1B show first and second views of an embodiment of an ultrasonic staking system 100 for applying ultrasonic energy to a head 101H (the target melt-area) of a fastening portion 101 having an elongated body 101B to fasten a first part 102 to a second part 104. The ultrasonic staking system 100 includes a horn 112, one or more controllers 120, a transducer 130, and an actuator 140. The body 101B fastening portion 101 can be connected to, or integrally formed with, the first part 102. The fastening portion 101 includes a flap-prone structure that resonates at frequencies of, for example, 40 kHz or less, causing the fastening portion 101 to flap when ultrasonic energy of 40 kHz, or less, is applied.

Figure 1C:
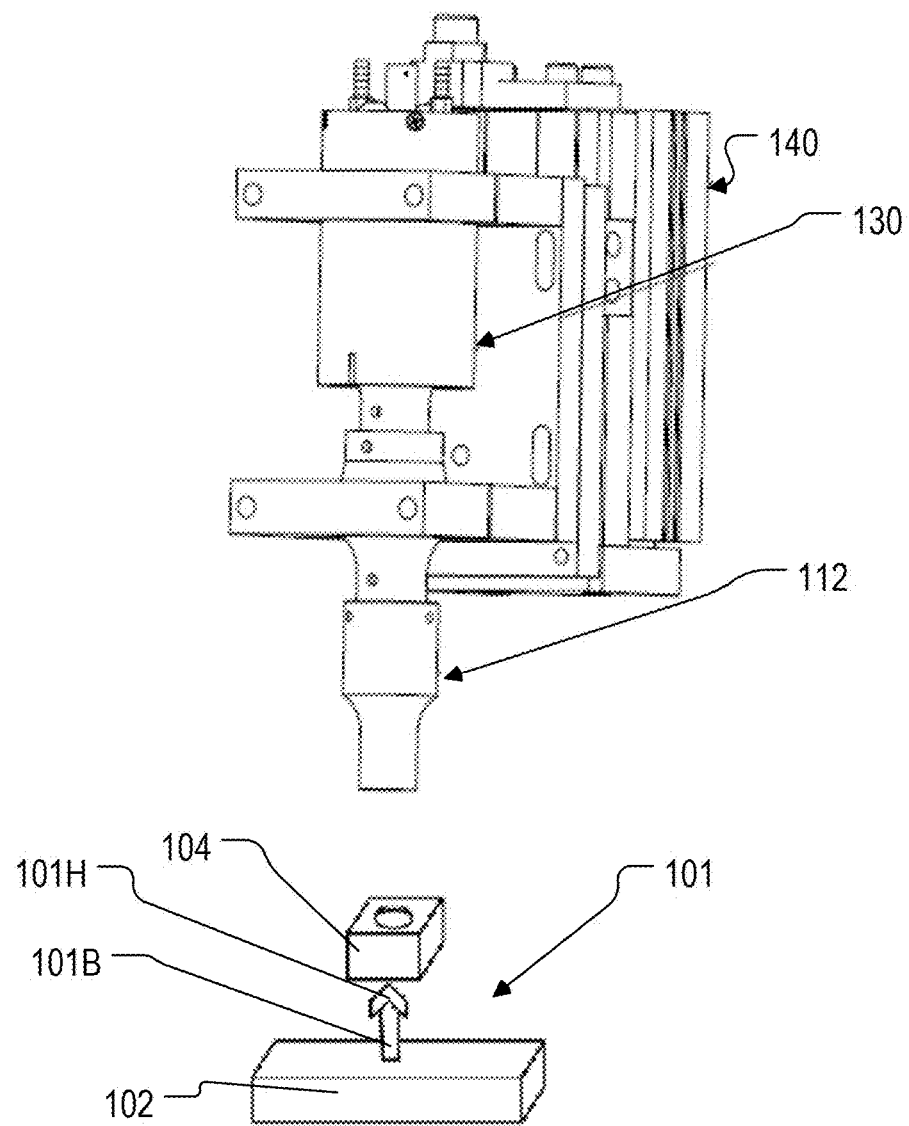
FIG. 1C illustrates a portion of the ultrasonic staking system in FIGS. 1A and 1B.

FIG. 1C shows a partial assembly that includes the horn 112, transducer 130, and actuator 140. While the ultrasonic staking system 100 can be implemented as a stand-alone press as depicted in the embodiment in FIGS. 1A and 1B, the ultrasonic stacking system can be implemented on a simpler motion stage in a larger automation system, as seen in FIG. 1C.

The fastening portion 101 can have a flap-prone structure such as, for example, a tab, a rib, a boss, a gusset, an insert, or other structure having an elongated body that flaps when a resonance frequency is applied to the structure. For instance, when a resonance frequency of 40 kHz, or less, applied to the fastening portion 101, the elongated body 101B sways to-and-fro, or back-and-forth, with respect to the longitudinal axis of the body 101B in the resting, non-resonating position. For instance, the body 101B flaps back-and-forth, oscillating between opposite directions along opposing directional vectors that are mostly perpendicular to the longitudinal axis of the body 101B (as measured when the body 101B is in its resting, non-excited position). The fastening portion 101 can have a rectangular or trapezoidal cross-section that is prone or disposed to flapping. The flapping portion 101 can have a structure with a rectangular or trapezoidal cross-section that decreases in cross-section area, with the head 101H having a smaller cross-section area than the base portion of the body 101B, which connects to the part 102.

In certain applications, the fastening portion 101 can include a tab or rib (shown in FIGS. 2-4) used in the automotive industry to fasten two or more parts together such as, for example, an inner door panel to an automotive door or a dashboard component to a dashboard or automotive frame. In various embodiments, the fastening portion 101 has a rectangular or trapezoidal cross-section and the head 101H has a collapse length (or distance) of between about 8 mm and up to about 25 mm, most common being between 8 mm and about 15 mm. In an embodiment, the head 101H has a collapse length of 8 mm.

The fastening portion 101, which includes the head 101H and elongated body 101B, is designed and constructed to fit in and through a corresponding hole in the second part 104 (and/or additional parts, not shown) such that, when the parts 102 and 104 (and additional parts, not shown) are connected to each other, the head 101H protrudes from a surface of the part 104 and can be acted on by a horn 112. The ultrasonic staking system 100 applies ultrasonic energy via the horn 112 to the head 101H to melt the structure into, for example, a mushroom shape and, thereby, secure the parts 102 and 104 to each other without any resonance disaster.

In embodiments, the ultrasonic staking system 100 melts the end 101H to a mushroom shape that has, for example, a cross-section having a rectangular shape, generally. For example, the head 101H, when melted, will result in a melt-form having mushroom shape with a substantially rectangular cross-section—that is, a cross-section having a pair of sides that are parallel to each other and significantly longer than the other pair of sides that are parallel to each other, but substantially perpendicular to the longer sides.

The ultrasonic staking system 100 includes an ultrasonic melt-forming stack comprising the horn 112 arranged to engage and press the head 101H of the fastening portion 101 to melt the head 101H to fasten and secure the first part 102 to the second part 104 (and any additional parts, not shown). The parts 102 and 104 can have the same or different materials. The body 101B of the fastening portion 101 can be formed integrally as one piece with the part 102, or it can be attached to the part 102. For ease of discussion purposes only and without limiting the applications to which the present disclosure pertains, to which there are many, the parts 102 and 104 can be parts for an automobile that are to be affixed and secured to each other, such as, for example, parts of an inner panel for a door, dashboard, or other component of an automobile.

The horn 112 can be constructed and configured to the shape and the size of the head 101H of the fastening portion 101 for optimal melt-forming or staking. The horn 112 includes a distal portion that is configured to emit and apply ultrasonic energy at a frequency of 50 kHz, or greater, to the head 101H of the fastening portion 101, concentrating vibrations and heat in the head 101H to melt the target melt-area of fastening portion 101 next to the distal portion of the horn 112, while minimizing vibrations and heat distribution beyond the head 101H, and particularly beyond the fastening portion 101. In various embodiments, the horn 112 is configured to apply ultrasonic energy at frequencies between about 45 kHz and 75 kHz.

Applying an ultrasonic frequency of about 50 kHz to the fastening portion 101 having a flap-prone structure instead of 40 kHz, or less, is counter-intuitive. This is because the size of the structure (for example, 8 mm to 11 mm) and the flap-prone geometry is commensurate with a wavelength, frequency, and the material of that makes up the structure (for example, ABS). The amplitude of ultrasonic vibration depends on the applied ultrasound frequency, with the vibration amplitude being inversely proportional to the frequency—that is, as frequency increases, vibration amplitude decreases. Relatedly, the lower the vibration amplitude the lower the deliverable power will be, since the transducers will necessarily be smaller with increasing frequency. Since the amplitude of displacement determines how quickly the melting point of the fastening portion 101 is reached, it would be counterintuitive to apply 50 kHz to a larger structure (for example, 8 mm-11 mm, or larger) since the higher the frequency, the lower is the vibration amplitude and the lower the deliverable power (because the transducers are necessarily smaller for higher frequencies).

The ultrasonic staking system 100 includes one or more controllers 120 operatively coupled to the ultrasonic melt-forming stack. The one or more controllers 120 can be microelectronic controllers or processors, and can be controlled by any combination of software, firmware, or both to control the ultrasonic staking system 100, including the ultrasonic melt-forming stack and its movement, and the ultrasonic energy that is applied through the horn 112.

The ultrasonic staking system 100 includes the actuator 140 that is coupled to the stack, which includes the transducer 130 and the horn 112 to advance and retract the horn 112 under control of the one or more controllers 120. While some of the basic components of the ultrasonic staking system 100 are disclosed herein, the skilled person familiar with ultrasonic welding, ultrasonic melt-forming, or ultrasonic staking technologies will readily recognize common components and configurations, which are too numerous to mention here. A key finding by the inventors to eliminate the resonance disaster phenomenon involves operation of the ultrasonic staking system 100 at a frequency of about 50 kHz or greater, thereby not exciting the lower frequency natural resonances existing within part 101, and the configuration of the melt-forming stack in relation to various parts and their form factors. It should be understood that components such as power supplies, wiring harnesses, frames, and other cooperating components in various ultrasonic welding, ultrasonic melt-forming, or ultrasonic staking technologies, depending on the myriad of applications thereof, are not described herein for the sake of brevity and to focus the reader on salient aspects of the inventions.

Figure 19:
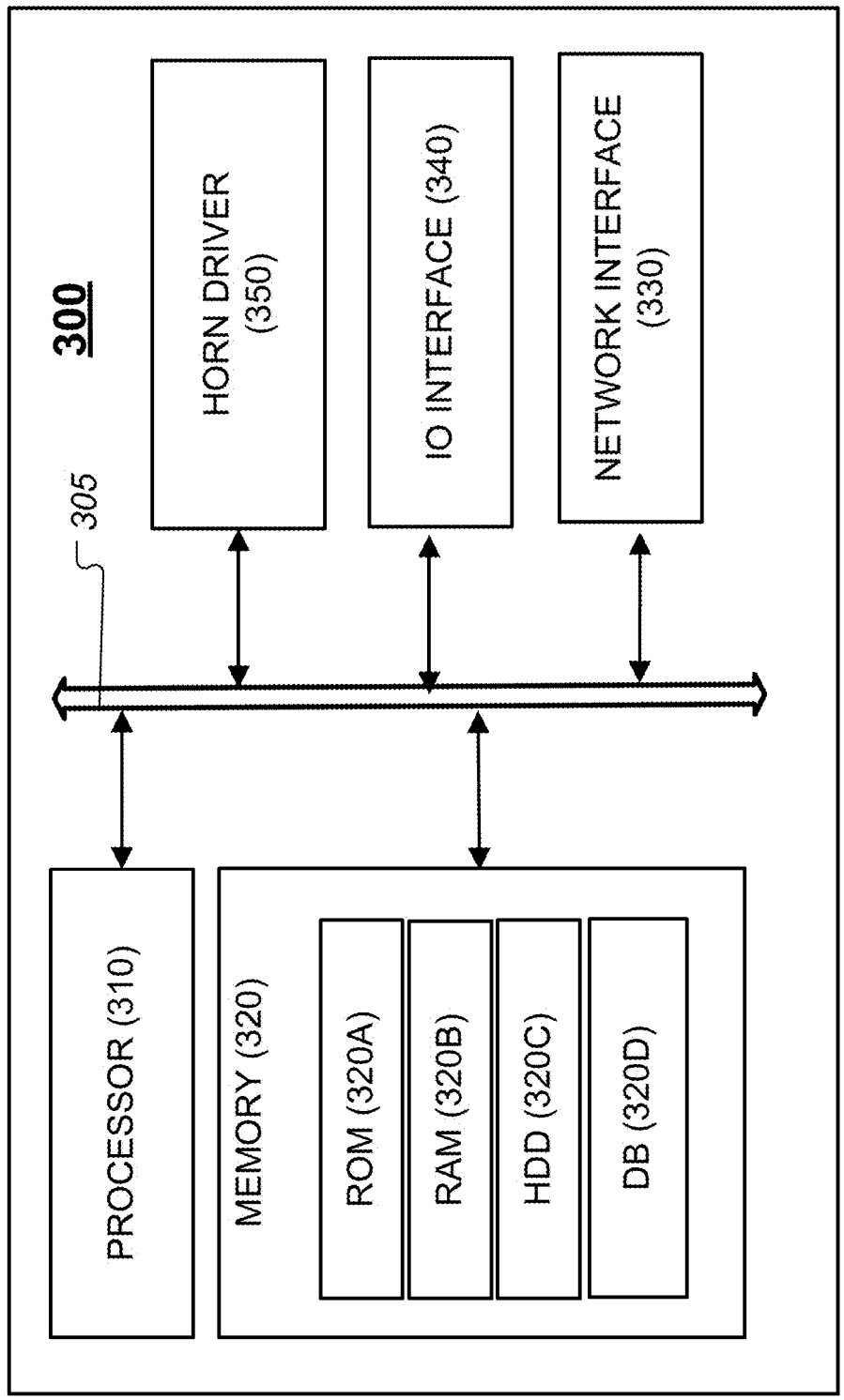
FIG. 19 illustrates a nonlimiting example of a controller included in the ultrasonic staking system shown in FIG. 1.

In an embodiment, the one or more controllers 120 include the controller 300 (shown in FIG. 19). In an embodiment, the ultrasonic staking system 100 is operated and controlled by the controller 300.

Figure 2:
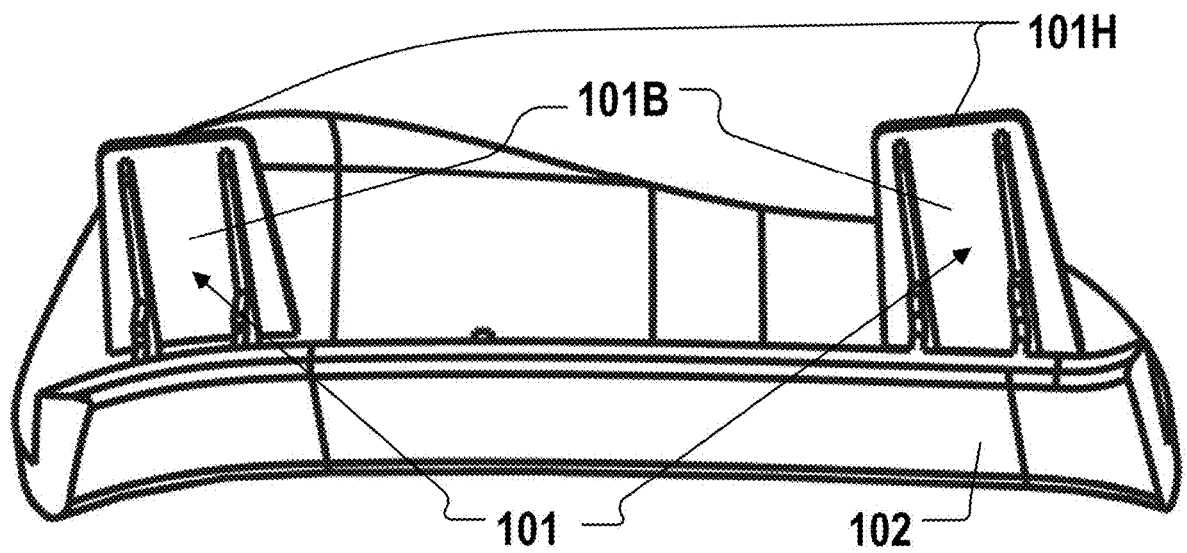
FIG. 2 illustrates a nonlimiting example of a part, including a flap-prone fastening portion, that can be joined to at least one other part using the ultrasonic staking system of FIG. 1.
Figure 3:
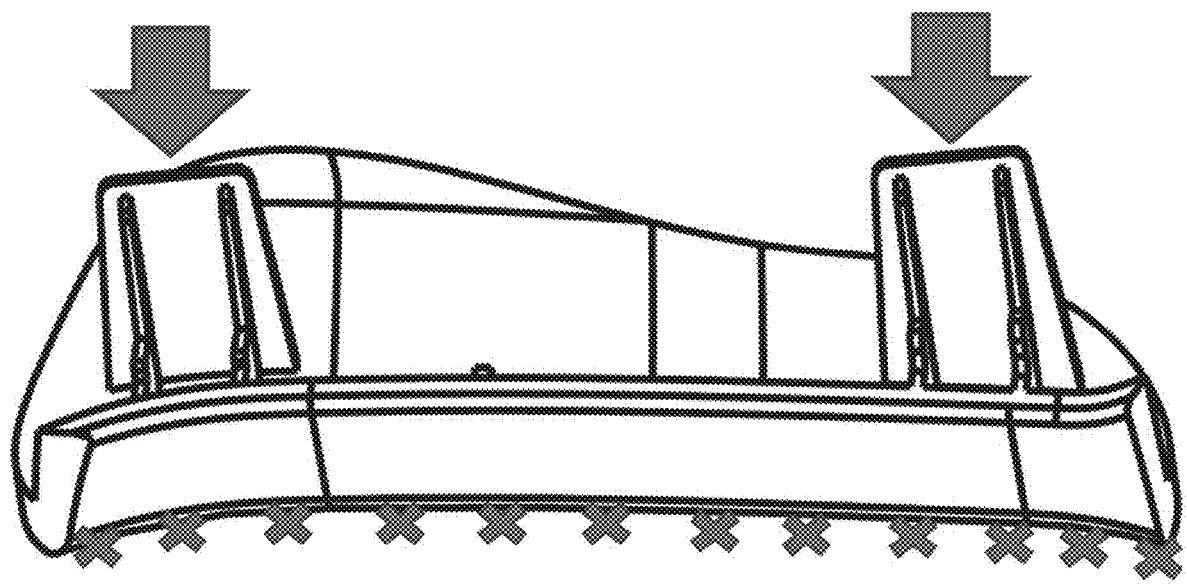
FIG. 3 illustrates locations at which a fixture support can support the part in FIG. 2, and the locations at which a horn of an ultrasonic staking system can apply ultrasonic energy to form a stake.

FIG. 2 illustrates a nonlimiting example of the part 102, including flap-prone fastening portions 101, each having a head 101H and an elongated body 101B; FIG. 3 illustrates the locations (shown as ※) of the fixture support (not shown) used to support the part 102 and the locations (shown as ※) engaged by the horn 112; and, FIG. 4 illustrates the locations at which the fastening portions 101 vibrate (or "flap") as a function of frequency.

Figure 4:
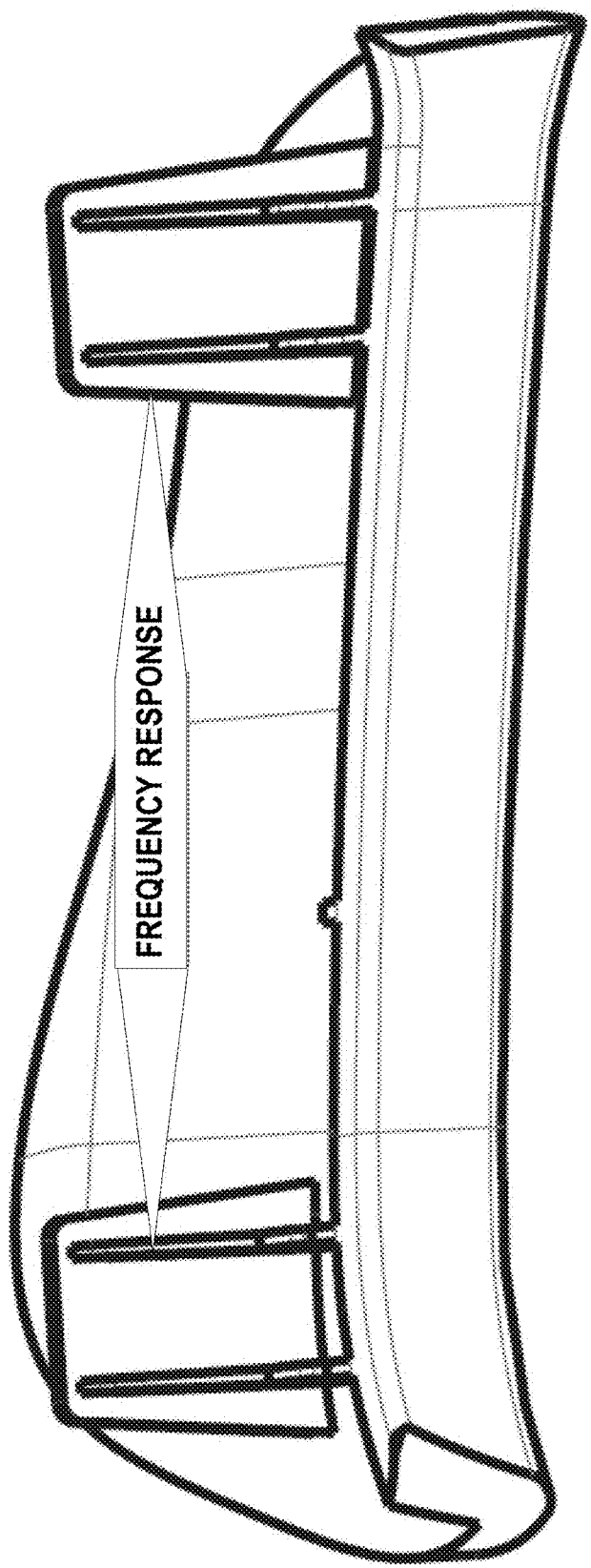
FIG. 4 illustrates locations at which a fastening portion vibrates (or "flaps") as a function of frequency.

In the example depicted in FIG. 4, a cyclic load of increasing frequency can be applied by the ultrasound staking system 100 to the fastening portions 101.

In the example in FIGS. 2-4, each fastening portion 101 includes a head 101H and an elongated body 101B having a tab or rib geometry and a substantially rectangular cross-section. In the illustrated example, the fastening portions 101 can be made of acrylonitrile butadiene styrene (ABS) or other thermoplastic material. The inventors discovered that widespread breakage problems result when using ultrasonic energy at frequencies such as 20 kHz, 30 kHz, 35 kHz, or 40 kHz to melt heads 101H having an ABS tab or rib geometry such as those commonly used in automotive parts. The inventors discovered that such fastening portions 101 having common tab or rib structures exhibited natural resonances in frequency ranges of about 40 kHz or less. The inventors determined that such natural resonances commonly result in unpredictable vibrations and excessive stress within the fastening portions 101, particularly when applying ultrasonic frequencies of 20 kHz, 30 kHz, 35 kHz, and 40 KHz. Such frequencies were observed to result in significant unwanted, parasitic vibrations in the structures of the fastening portions 101, resulting in wasted ultrasonic vibration energy, longer weld times, and breakage of the structures. Moreover, in certain experiments, automation lines using such ultrasonic frequencies (i.e., 20/30/35/40 kHz) had to be equipped with hydraulic speed controls or servo actuators to adjust the velocity during melting of the tab to avoid breakage, thereby resulting in substantial added costs.

On the other hand, operating the ultrasonic staking system 100 at 50 kHz created a consistent molten layer in the fastening portion 101 near the horn 112. In experiments, the ultrasonic staking system 100 with pneumatic actuator operating at 50 kHz melted the head 101H to form a thin molten layer with significantly reduced stress and vibrations in the fastening portion 101 compared to, for example, ultrasonic frequencies of 40 kHz, or less. The system 100 also provided a better controlled melting process at 50 kHz due to the lower amplitude and higher frequency of 50 kHz compared to frequencies of 40 kHz or less. Operating at 50 kHz, the horn 112 applies ultrasonic energy to melt the head 101H to provide a molten layer that can act as a natural hydraulic speed controller or servo actuator, but without the need or cost of including either technology since the ultrasonic staking system 100 is able to create a consistent molten layer near the horn 112 by ensuring improved energy transfer and conversion of ultrasonic motion into heat (for example, compared to 20/30/35/40 kHz frequencies) due to, for example, concentration of ultrasonic vibration near the contact area between the horn 112 and fastening portion 101, such as the head 101H.

In the embodiments of the fastening portions 101 that included tab or rib structures such as those shown in FIGS.

2-4, the fastening portions 101 were each observed to start melting at the top of the fastening portion 101 (for example, the head 101H) without transferring any significant amount vibrations to the bottom of the fastening portion, where the structure was susceptible to breakage using lower frequencies, such as, for example, 20 kHz, 30 kHz, 35 kHz, or 40 kHz.

At ultrasonic frequencies of 40 kHz or below, heat and vibration energy transfer from the horn 112 into the molten plastic of the fastening portion 101 (for example, tab or rib) is much greater, which results in the longer weld time compared to an operating frequency of 50 kHz.

Figure 5:
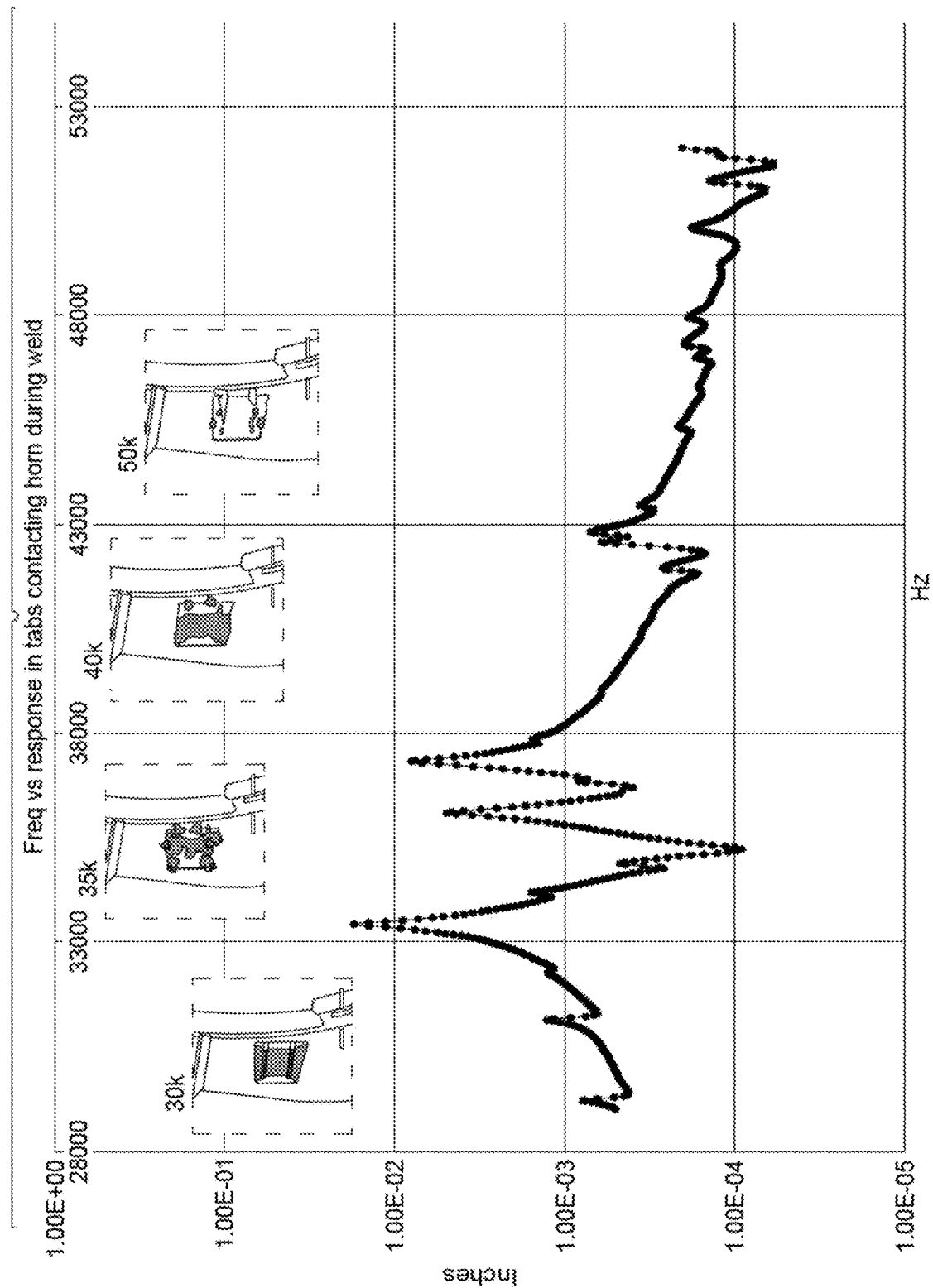
FIG. 5 illustrates an example of an FEM generated frequency response plot showing an amplitude at which locations on the fastening portion (shown in FIGS. 2-4) vibrate as a function of frequency.

FIG. 5 illustrates an example of a frequency response plot showing the amplitude of unwanted "flapping" vibrations of the fastening portion 101 (for example, tab) as a function of frequency. In the illustrated frequency response plot, the fastening portion 101 was integrally formed (for example, molded) with the part 102, which was supported by a fixture (not shown) and restricted at the head 101H by the horn 112.

As seen in FIG. 5, the locations on the fastening portion 101 that exhibited the greatest vibration amounts occurred at frequencies of about 34 kHz (1.3E-02 inches), about 36 kHz (1.8E-03 inches), and about 37 kHz (1.9E-03 inches). In the diagram, the y-axis (i.e., in units of inches) is logarithmic, which understates the differences. As seen, the maximum heat that occurs in the body 101B of the fastening portion 101 (non-melt part of the tab in FIGS. 2-4) is considerably less when the horn 112 operates at a frequency of 50 kHz compared to 30 kHz or 40 kHz. Further, the Vicat softening temperature for the fastening portion 101 made of ABS plastic was exceeded with 30 and 40 kHz, but not with 50 kHz, therefore the 50 kHz welding frequency is less likely to damage the tab.

In an experiment conducted with the horn 112 operating at 30 kHz, the ABS plastic structure of the fastening portion 101 (the tab shown in FIGS. 2-4) revealed cracking. The power level during the melt-forming was less consistent over time when melting the head 101H at 30 kHz as compared to 50 kHz. Also, greater audible noise was created when melt-forming at 30 kHz compared to 50 KHz.

In various experiments, the same collapse distance (8 mm) and velocity (2 mm/second) were used for melting the heads 101H of the fastening portions 101. Resonance destruction (a fault condition) prevented the full melt distance of any of the heads 101H at 30 KHz.

Table 1 (shown below) illustrates the maximum temperatures reached in Fahrenheit degrees in the fastening portions 101 (tab structures) depicted in FIGS. 2-4 for operating frequencies of 50 kHz, 40 kHz, and 30 kHz, namely 226° F., 256° F., and 254° F., respectively.

TABLE 1

| Frequence | Max Temperature (deg F.) |
| --- | --- |
| 50 | 226 |
| 40 | 256 |
| 30 | 254 |

Figure 6:
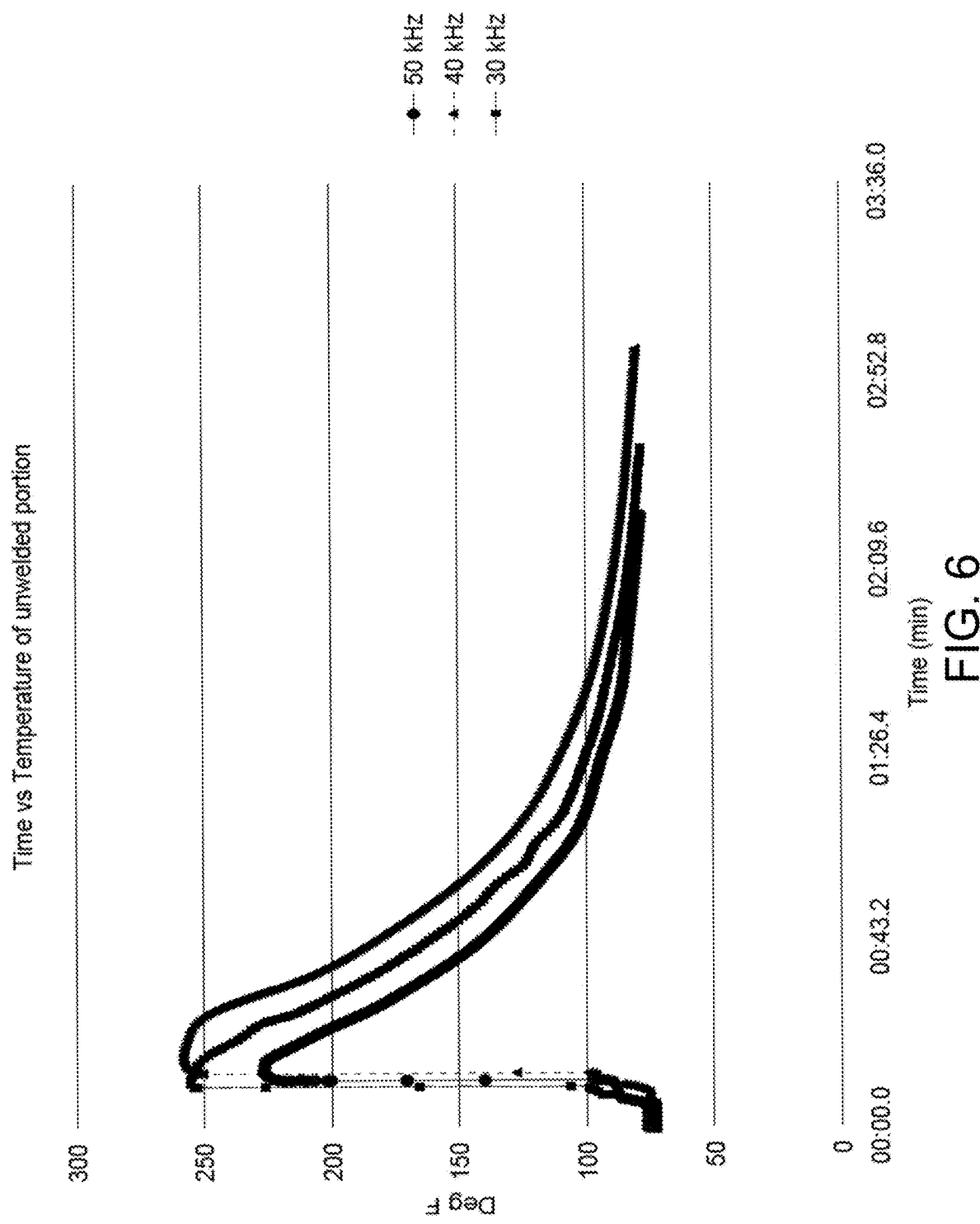
FIG. 6 illustrates temperatures of a body (or non-melt part) of the fastening portion (shown in FIGS. 2-4) as a function of time for frequencies of 50 kHz, 40 kHz, and 30 kHz observed during testing.

FIG. 6 illustrates the temperatures of the body 101B (or non-melt part) of the fastening portion 101 as a function of time for frequencies of 50 kHz (lowest temperature curve), 40 kHz (highest temperature curve), and 30 kHz (middle temperature curve) with the highest temperatures observed during and immediately after application of the ultrasound energy by the horn 112 in each instant. Since this heat is measured outside of the immediate welding area, that means such temperature increase is due to the undesired strain and stress in the part during the welding process. As seen in the diagram, the body 101B reaches a temperature high of 256° F. at 40 kHz and maintains that temperature high for the longest of the three experiments. In a close second, the body 101B reaches a temperature high of 254° F. at 30 kHz and maintains the temperature high for almost as long as with 40 kHz experiment. Comparatively, the body 101B reaches a temperature high of 226° F. at 50 kHz and maintains the temperature high only for an instant before dropping off logarithmically.

Figure 7:
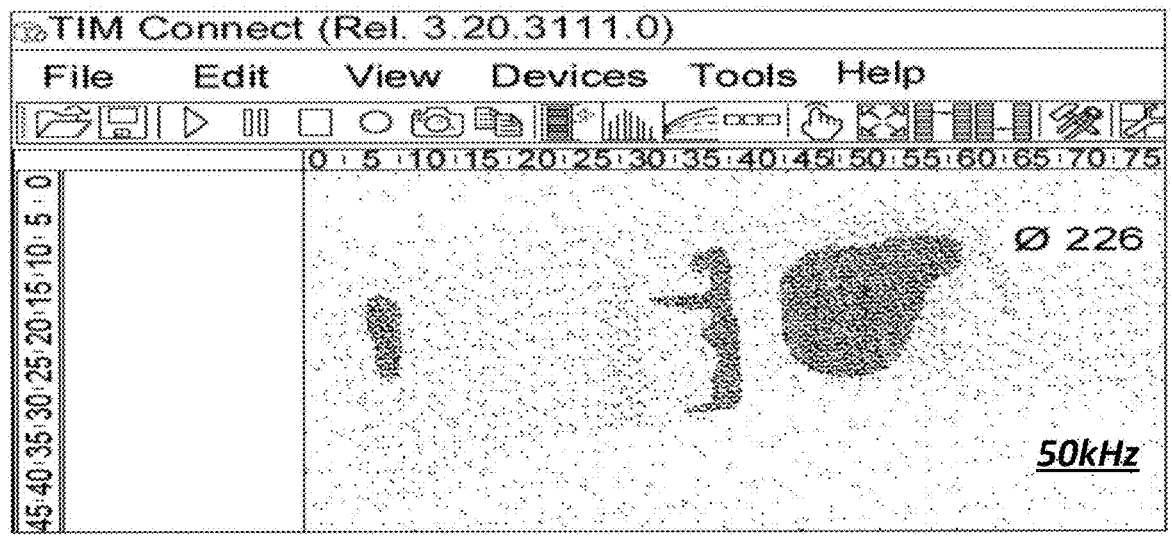
FIG. 7 illustrates heat distribution in the fastening portion (shown in FIGS. 2-4) immediately after ceasing application of ultrasound energy at a frequency of 50 KHz.
Figure 8:
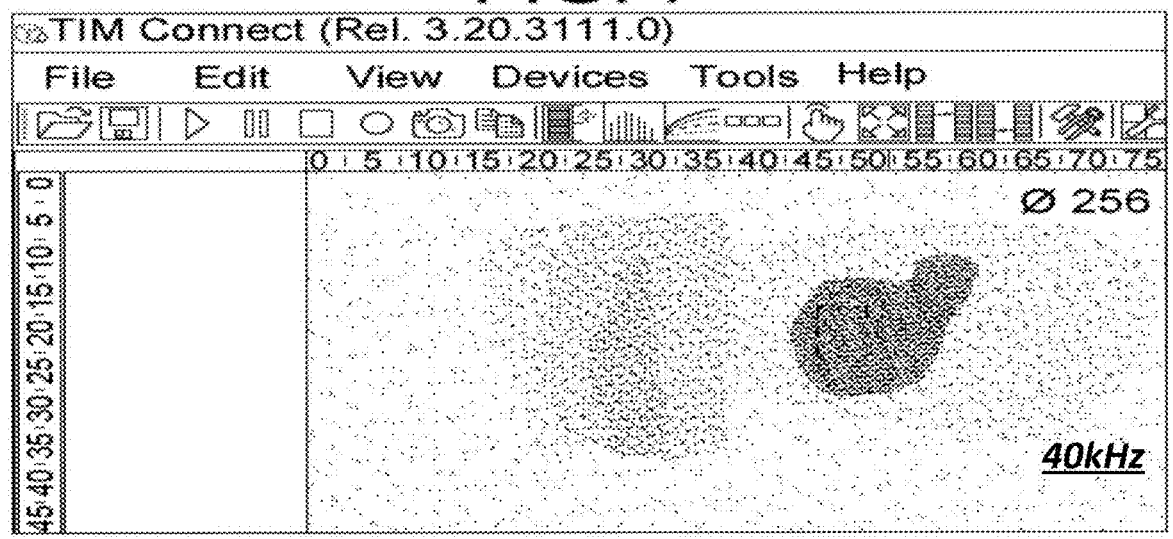
FIG. 8 illustrates heat distribution in the fastening portion (shown in FIGS. 2-4) immediately after ceasing application of ultrasound energy at a frequency of 40 KHz.
Figure 9:
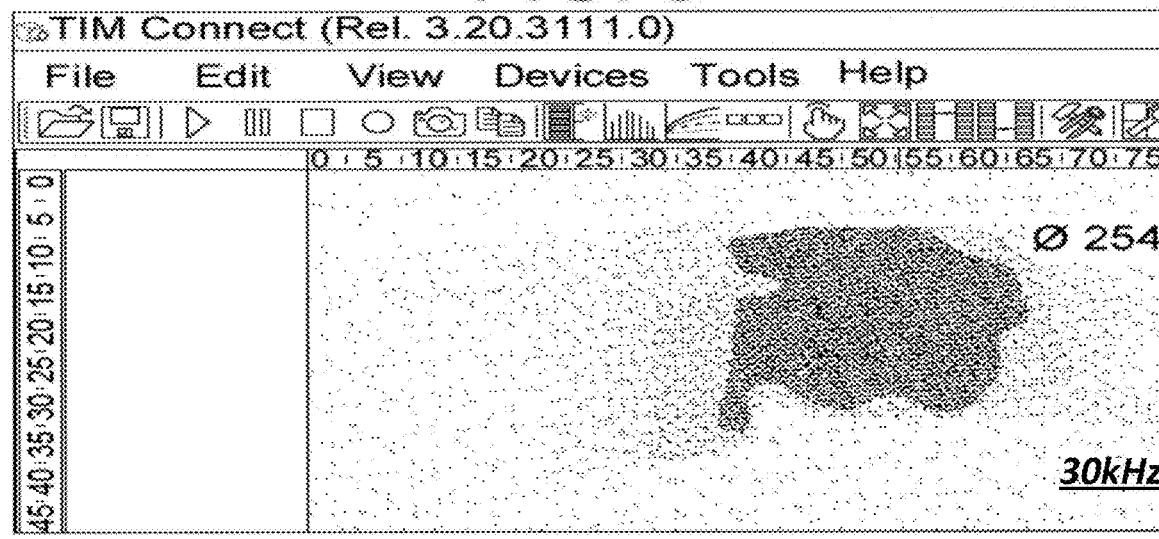
FIG. 9 illustrates heat distribution in the fastening portion (shown in FIGS. 2-4) immediately after ceasing application of ultrasound energy at a frequency of 30 kHz.

FIGS. 7, 8, and 9 illustrate heat distributions in the fastening portion 101 immediately after ceasing application of ultrasound energy by the horn 112 operating at a frequency of 50 kHz, 40 kHz, and 30 kHz, respectively. As seen, the fastening portion 101 exhibits the most concentrated heat and the lowest peak temperature at 50 kHz (FIG. 7), as compared to 40 kHz (FIG. 8) and 30 kHz (FIG. 9), including at the part of the head 101H—that is, the part of the fastening portion 101 closest to the horn 112.

Figure 10:
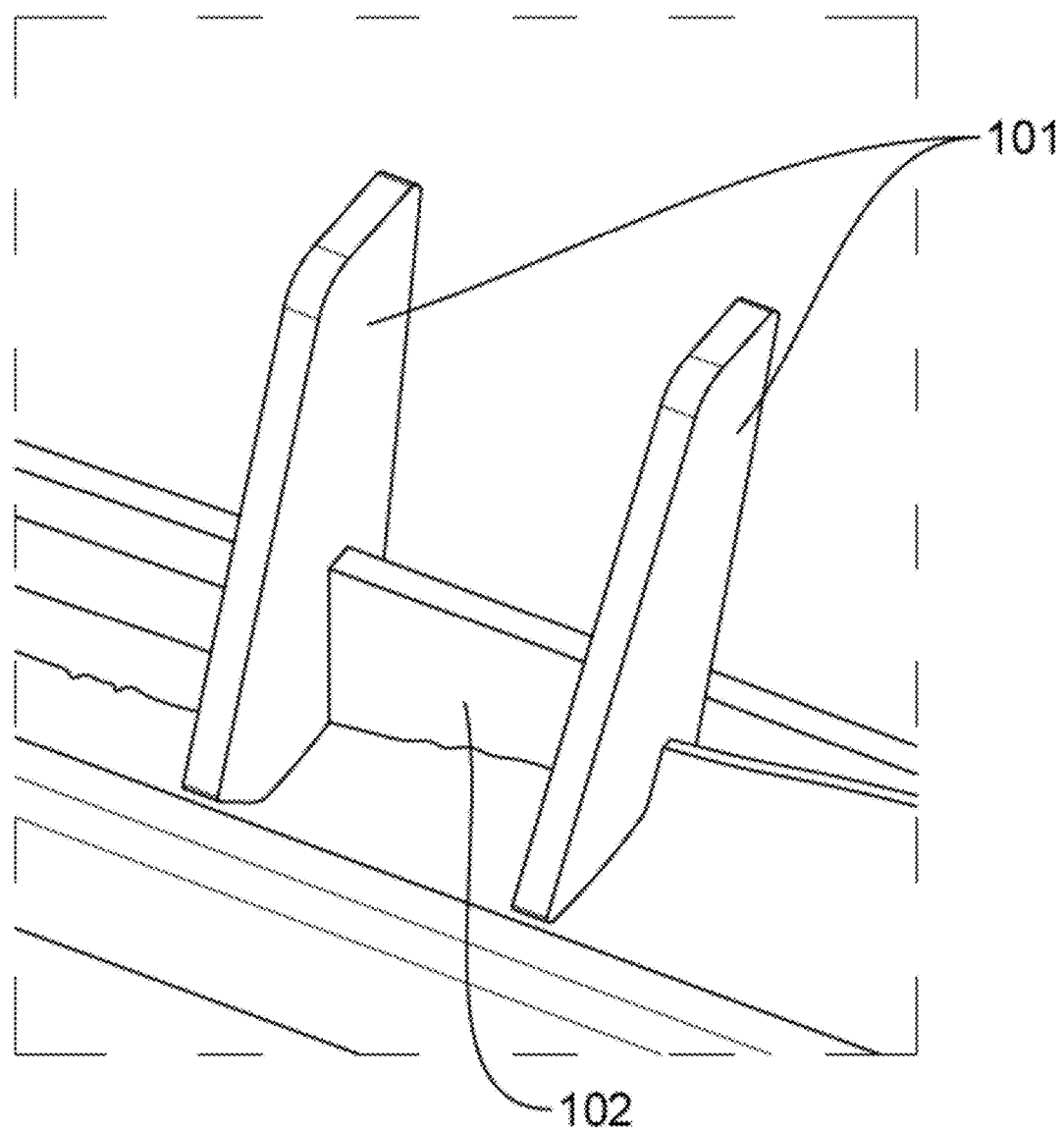
FIG. 10 illustrates another nonlimiting example of a fastening portion and part 102.

FIG. 10 depicts another nonlimiting example of fastening portions 101 and part 102. As seen, the fastening portions 101 each have a substantially rectangular (or trapezoidal) cross-section.

Figure 11:
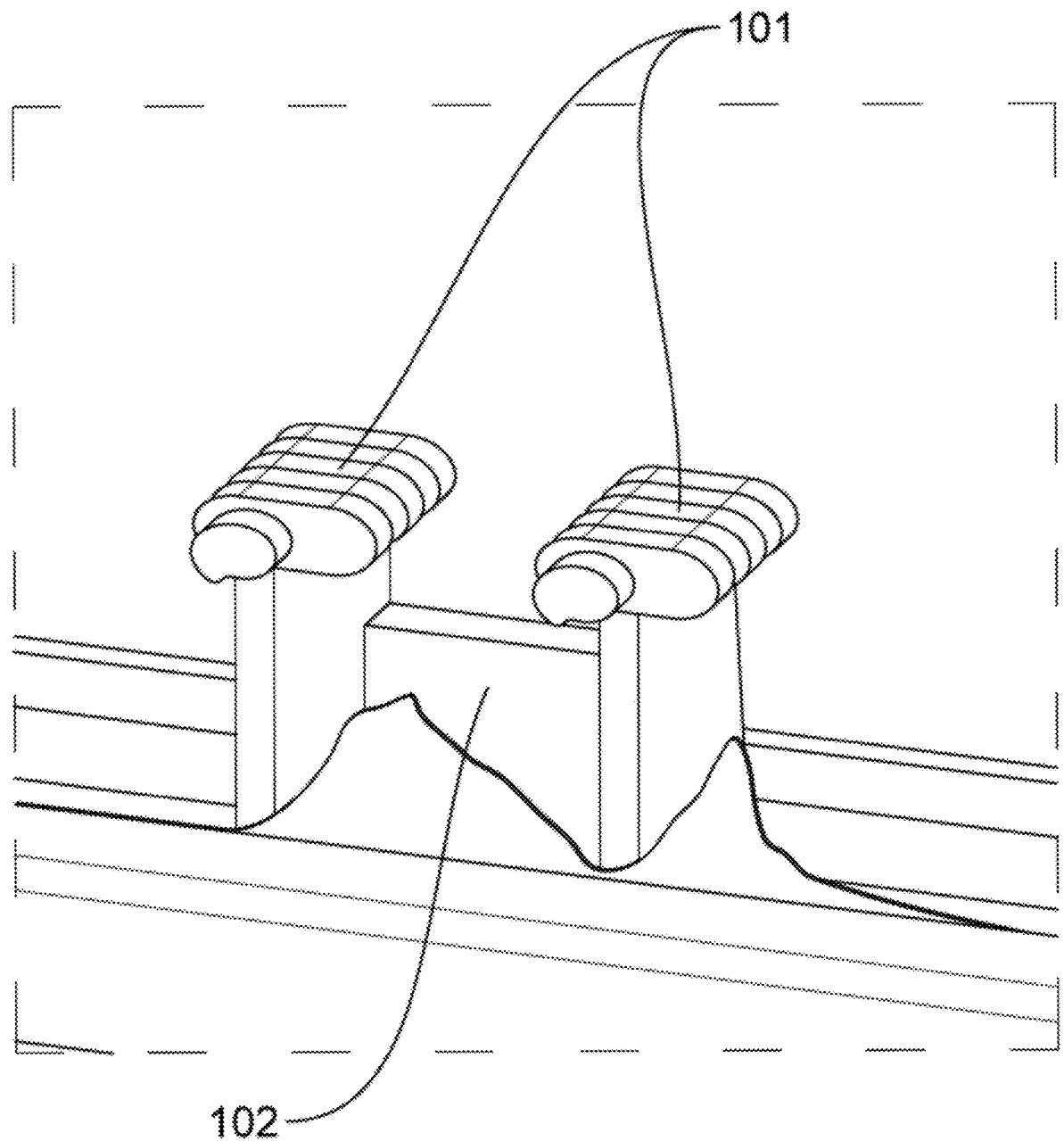
FIG. 11 illustrates the fastening portion of FIG. 10 with a head of the fastening portion melted at a frequency of 50 kHz, without any resultant resonance disaster phenomenon.

FIG. 11 depicts the same example of the fastening portions 101 and part 102 seen in FIG. 10, except that the head 101H of each fastening potion 101 is melted at a frequency of 50 kHz, without any resultant resonance disaster phenomenon.

Figure 12:
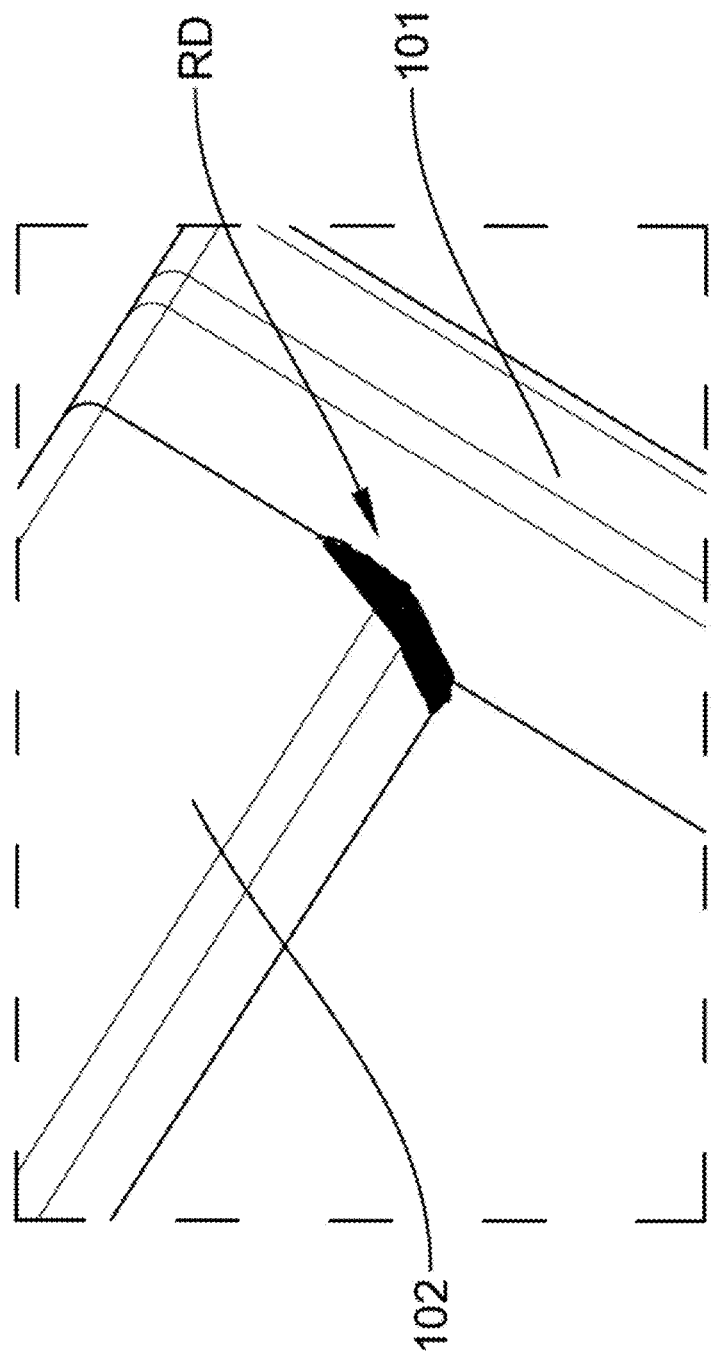
FIG. 12 illustrates a partial view of the head (shown in FIG. 10) after it has been melted at a frequency of 30 KHz.
Figure 13:
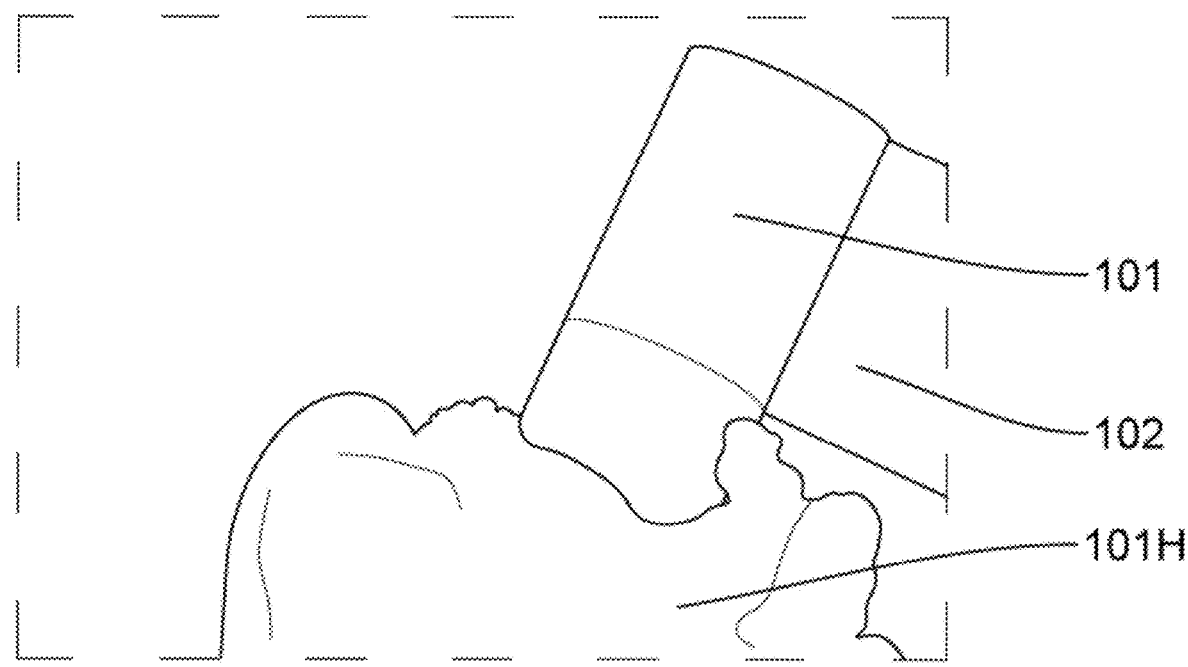
FIG. 13 illustrates a partial view of the head (shown in FIG. 10) after it has been melted at a frequency of 40 KHz.
Figure 14:
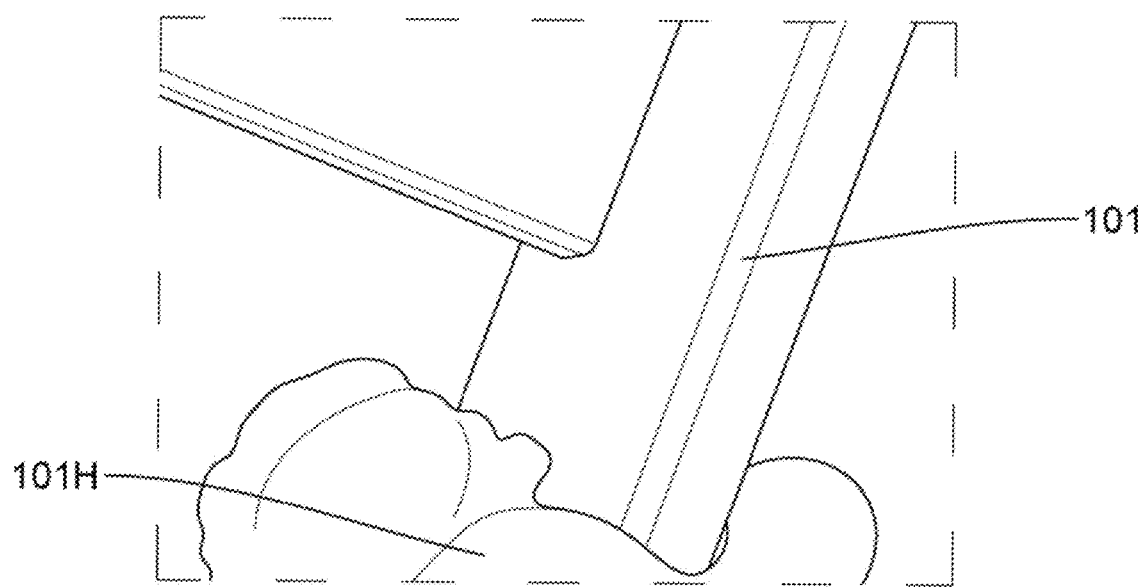
FIG. 14 illustrates a partial view of the head (shown in FIG. 10) after it has been melted at a frequency of 50 KHz.

FIGS. 12, 13, and 14 each illustrate a partial view of a part 102 with a head 101H that has been melted at a frequency of 30 kHz, 40 kHz, and 50 kHz, respectively. As seen in FIG. 12, the area between the fastening portion 101 and the part 102 exhibits a problematic resonance destruction (RD) at 30 kHz, which in the depicted example is a crack. Similarly, in FIG. 13, the fastening portion 101 exhibits an uncontrolled and unwanted melt at 40 kHz. At 50 kHz, however, neither fastening portion 101 nor the part 102 exhibit any resonance disaster phenomenon, but, rather, exhibit a controlled and desirable melt of the head 101H.

Figure 15:
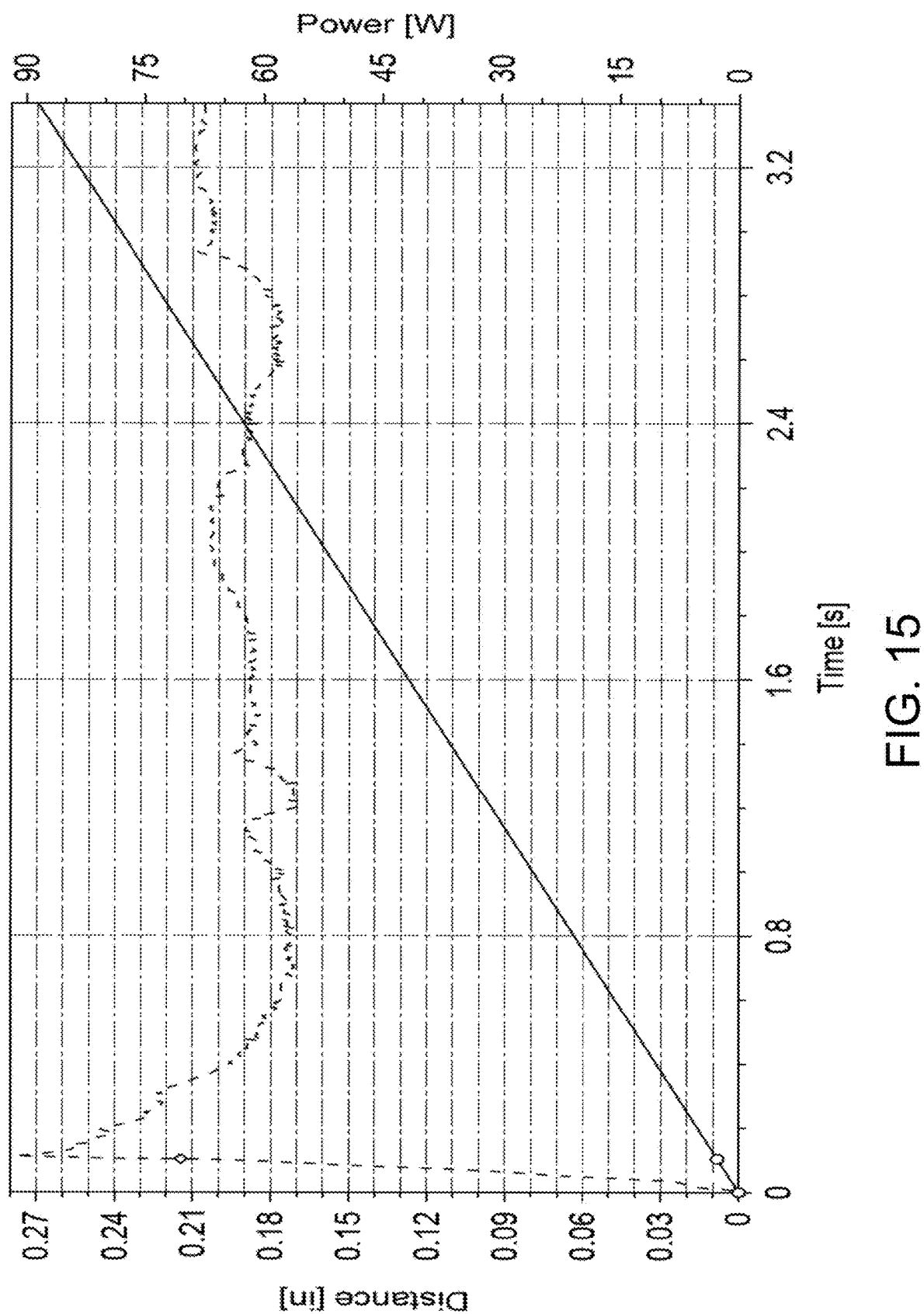
FIG. 15 illustrates collapse distance (or length in inches) and power (in Watts) curves as a function of time when ultrasound energy is applied to the head (shown in FIG. 10) at a frequency of 30 kHz.
Figure 16:
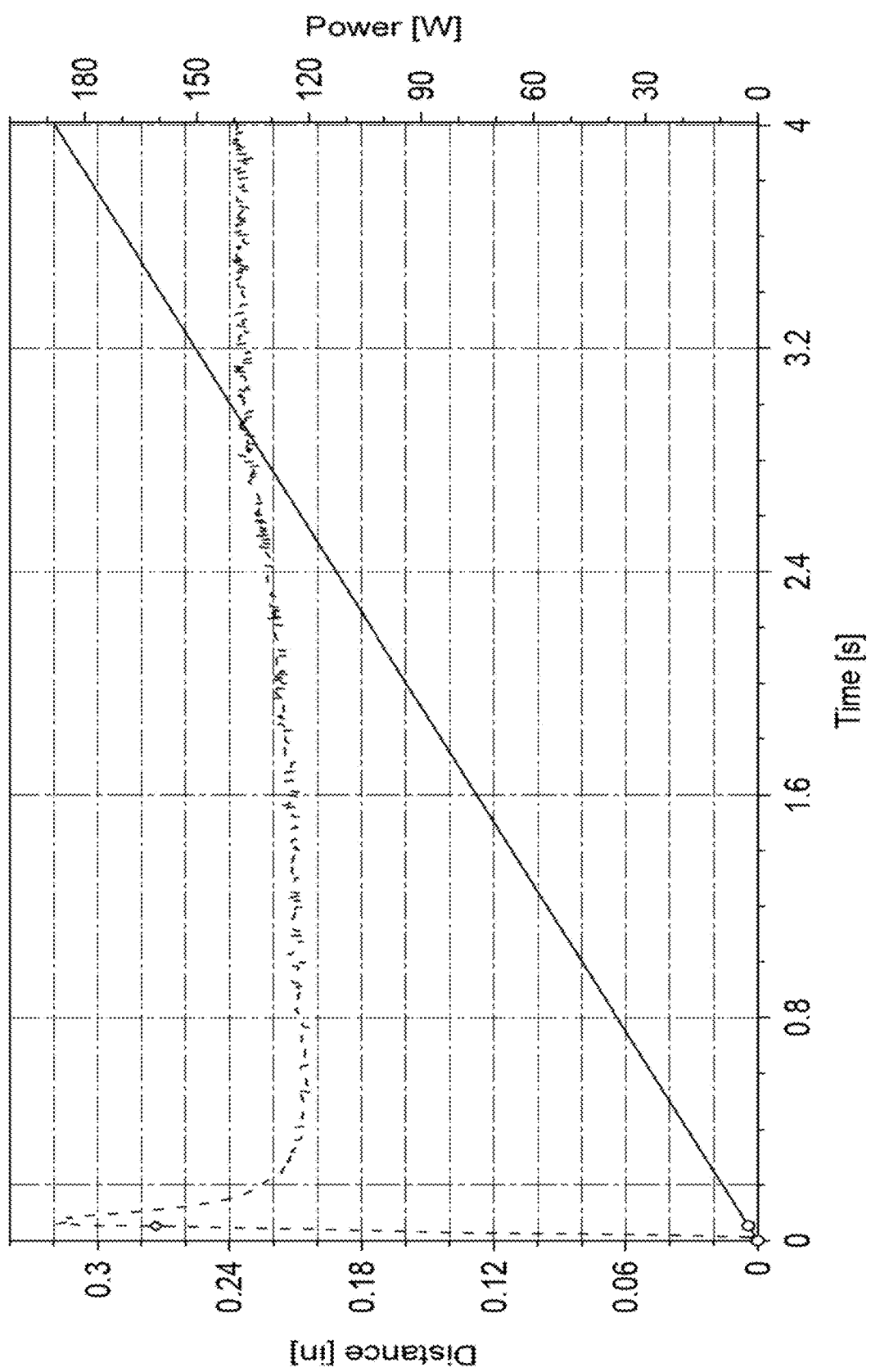
FIG. 16 illustrates collapse distance (or length in inches) and power (in Watts) curves as a function of time when ultrasound energy is applied to the head (shown in FIG. 10) at a frequency of 40 kHz.
Figure 17:
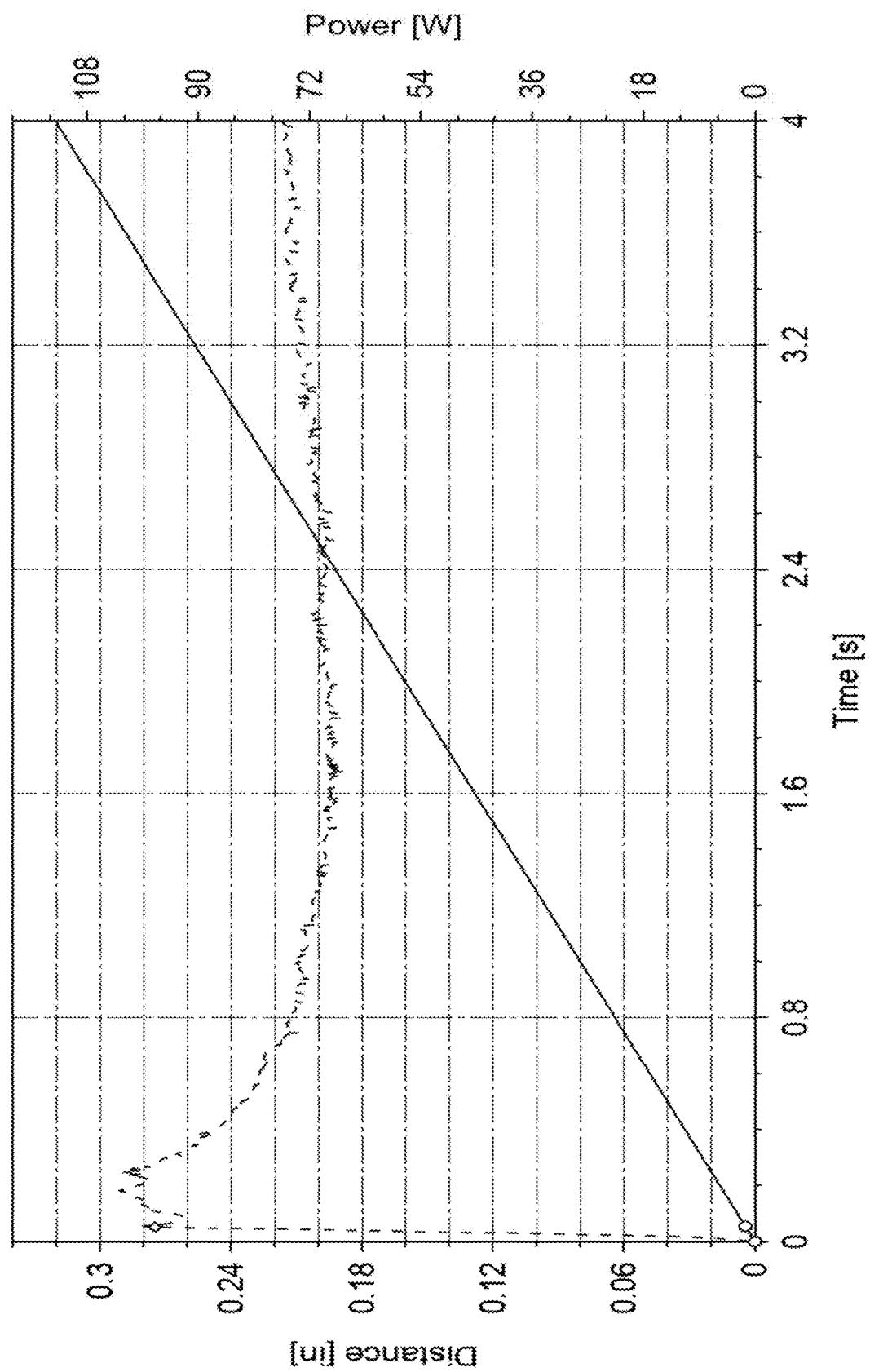
FIG. 17 illustrates collapse distance (or length in inches) and power (in Watts) curves as a function of time when ultrasound energy is applied to the head (shown in FIG. 10) at a frequency of 50 kHz.

FIGS. 15-17 illustrate collapse distance (or length in inches) and ultrasonic power (in Watts) curves as a function of time for the 30 kHz, 40 kHz, and 50 kHz melts, respectively, depicted in FIGS. 12-14. The collapse distance is the length (in inches) of the head 101H that is melted during melt-forming; and, the power is the power (in Watts) supplied to the horn 112 during the melt-forming. As seen in the figures, the 50 kHz frequency application exhibited substantially lower power usage than the 40 kHz application (about 74 W compared to about 130 W); and, the 50 KHz frequency application exhibited relatively constant power usage compared to the power usage at 30 KHz.

By applying a frequency above 40 kHz, such as 50 kHz or more, the ultrasound staking system 100 avoids exciting the natural resonances in the fastening portions 101 and, thereby, minimizes stress in, and failure rates of, the fastening portions 101 or part 102 during melt-forming or staking processes. By operating the horn 112 at 50 kHz, the head 101H is controllably melted to form, for example, a mushroom-shaped melt that secures the parts 102 and 104 to each other. The ultrasonic staking system 100 is able to accommodate and apply ultrasonic energy to numerous fastening portions 101, such as, for example, ABS (PC) tabs or ribs used in the automotive industry on a single part 102, without adding costly hydraulic speed control or using servo actuators while avoiding resonance destruction.

Commonly owned U.S. Pat. No. 10,710,311 to Petr Vasko, et al., issued Jul. 14, 2020, which is hereby incorporated herein in its entirety, describes operating ultrasonic welding equipment at a frequency in the range of 45-75 kHz to weld multiple thermoplastic parts together without causing visible read-through on an exposed surface of one of the parts. While this patent contemplates various welding applications using frequencies in the range of 45-75 kHz, the patent does not mention (nor mention addressing) the problem of resonance disaster relating to the size of parts to be fastened to each other, or any size or geometry of the fastening portions 101 in melting or heat-staking applications.

Figure 18:
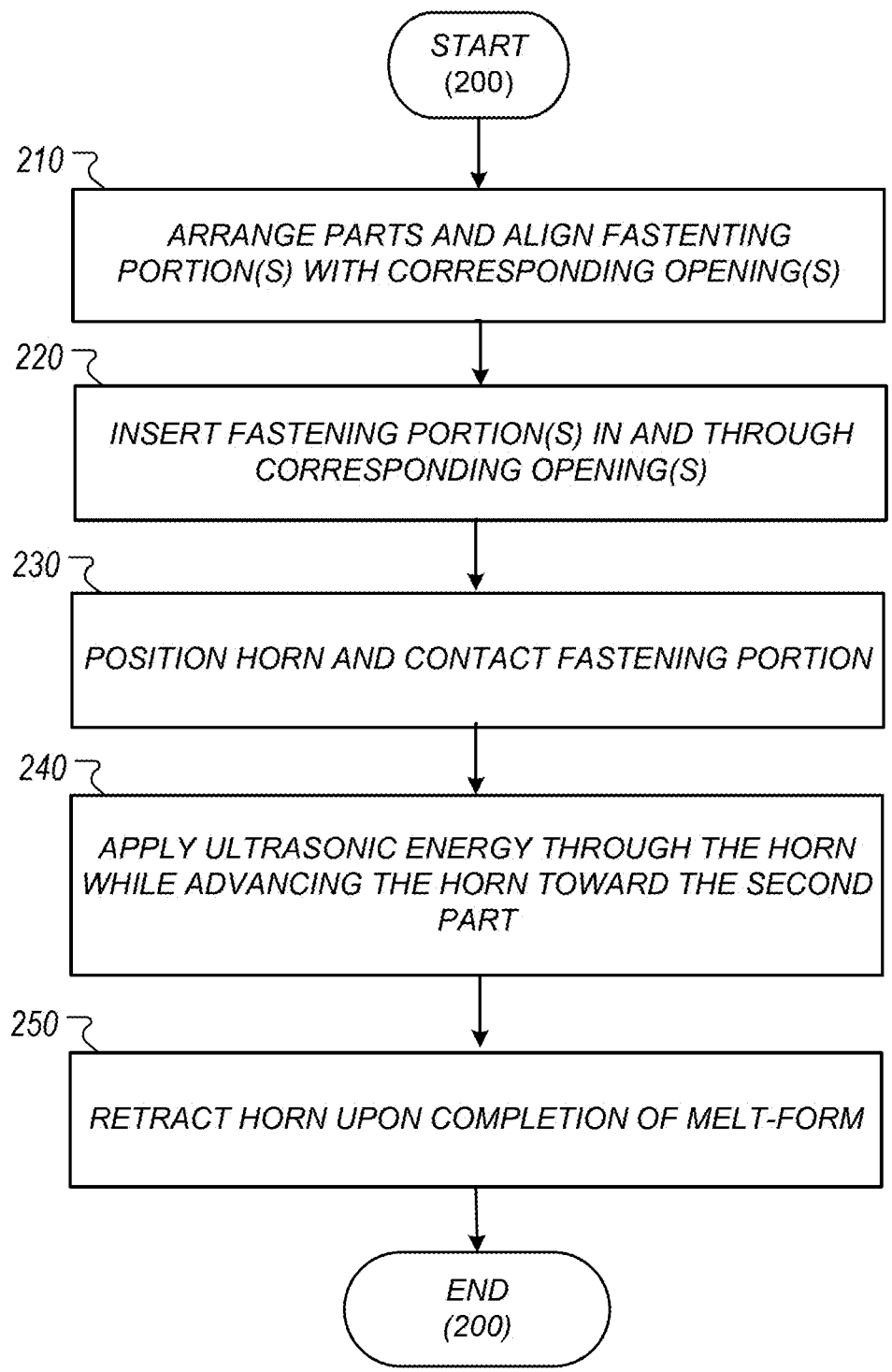
FIG. 18 is a flow chart of an example of an ultrasonic staking method.

FIG. 18 is an example flow chart illustrating an ultrasonic staking method 200 for fastening two or more parts (for example, parts 102 and 104 in FIG. 1) by melt-forming at least one flap-prone fastening portion (for example, fastening portion 101 in FIG. 1) to fasten the two or more parts to each other without causing resonance disaster on any part or the fastening portion(s).

Referring to the nonlimiting embodiment in FIG. 1, the method 200 includes arranging the parts 102, 104 and aligning each fasting portion 101 with the corresponding opening in the part 104 (Step 210). Once each fastening portion 101 and corresponding opening are aligned, the parts 102 and 104 are pressed together, thereby inserting the fastening portion(s) 101 in and through the corresponding opening(s) (Step 220).

After the parts 102 and 104 have been pressed together and the head 102H of each fastening portion 101 protruding above the surface of the part 104, the horn 112 is positioned and pressed against the head 101H (Step 230). Ultrasonic energy is applied through the horn 112 while advancing the horn 112, for example, along a longitudinal axis of the fastening portion 101 (Step 240). During this step, the distal portion of the horn 112 advances toward the part 104 and, while moving, melts through the collapse length of the head 101H (for example, 8 mm) until it is stopped.

In certain embodiments, the advance of the horn 112 during melting of the head 101H can be stopped when the area of the resulting melt-form is a predetermined shape or a predetermined size, such as, for example, a shape or a size that is substantially greater in area than the area of the corresponding opening, thereby securing the parts 102 and 104 to each other via the body 101B of the fastening portion 101.

In an embodiment, the advance of the horn 112 during melting of the head 101H can be stopped when the horn 112 travels the entire distance of the collapse length of the head 101H, such as, for example, 8 mm. Alternatively, the advance of the horn 112 could be stopped once the either force applied to the stack or ultrasonic power exceeds the predetermined limit, which is associated with the condition when part 104 is driven sufficiently close to part 102.

In an embodiment, the horn 112 is advanced at a velocity of about 2 mm/second during the melt process. In various embodiments, the horn 112 can be moved during the melt at velocities greater than 2 mm/second, or less than 2 mm/second. Advancing the horn during the melt faster than 3-4 mm/sec is more likely to result is breaking the tab.

The melt-form can have, for example, a substantially flat, mushroom shape. The horn 112 can be retracted from the fastening portion 101 before the horn 112 reaches the surface plane of the part 104 (step 250).

An embodiment is contemplated wherein the head 101H is melted to create a melt-form that is substantially flat and/or substantially in the same plane as a surface of the part 104.

The stakes formed by the ultrasonic staking system 100, or the method 200, can repeatably produce quality stakes that are consistent in appearance and mechanical fastening performance.

Table 2 (shown below) illustrates specifications of a nonlimiting example of the part 102, including flap-prone fastening portions 101, that can be joined to a part 104 by the ultrasonic staking system 100 and/or method 200 including the Vicat Softening Temperature.

TABLE 2

|  | Nominal Value (English) | Nominal Value (SI) | Test Method |
|---|---|---|---|
| Physical |  |  |  |
| Density | 1.05 g/cm$^3$ | 1.05 g/cm$^3$ | ISO 1183 |
| Apparent Density | 0.65 g/cm$^3$ | 0.65 g/cm$^3$ | ISO 60 |
| Melt Mass-Flow Rate (MFR) (220° C./10.0 kg) | 6.5 g/10 min | 6.5 g/10 min | ISO 1133 |
| Molding Shrinkage | 4.0E−3 to 7.0E−3 in/in | 0.40 to 0.70% | ISO 294-4 |
| Mechanical |  |  |  |
| Tensile Modulus | 319000 psi | 2200 MPa | ISO 527-2 |
| Tensile Stress (Yield) | 6240 psi | 43.0 MPa | ISO 527-2 |
| Tensile Strain (Yield) | 31% | 3.1% | ISO 527-2 |
| Flexural Modulus [1] | 319000 psi | 2200 MPa | ISO 178 |
| Flexural Stress [1] | 11000 psi | 76.0 MPa | ISO 178 |
| Impact |  |  |  |
| Charpy Notched impact Strength |  |  | ISO 179/1eA |
| −22° F. (−30° C.) | 5.7 ft-lb/in$^2$ | 12 kJ/m$^2$ |  |
| 73° F. (23° C.) | 8.1 ft-lb/in$^2$ | 17 kJ/m$^2$ |  |
| Thermal |  |  |  |
| Heat Deflection Temperature |  |  | ISO 75-2/A |
| 264 psi (1.8 MPa), Unannealed | 185° F. | 85.0° C. |  |
| 264 psi (1.8 MPa), Annealed | 212° F. | 100° C. |  |
| Vicat Softening Temperature | 226° F. | 108° C. | ISO 306/850 |

FIG. 19 illustrates a nonlimiting example of a controller 300, constructed according to the principles of the disclosure. The controller 300 includes a bus 305, a processor 310, a memory 320, a network interface 330, an input-output (IO) interface 340, and a horn driver 350. Any of the components 310 to 350 can be interconnected using various buses, including the bus 305, and can be mounted on a common motherboard or in another manner, as appropriate.

The processor 310 can be arranged to process instructions for execution within the controller 300, including instructions stored in the memory 320. The stored instructions can include instructions to perform the method 200 (shown in FIG. 18). The processor 310 can include any of various commercially available processors. Dual microprocessors and other multi-processor architectures can be employed as the processor 310. The processor 310 can include a central processing unit (CPU), an application-specific integrated circuit (ASIC), or a graphic processing unit (GPU). The processor 310 is arranged to interact with all of the components in the controller 300 to carry out or facilitate the processes described herein.

The bus 305 can include any of several types of bus structures that can further interconnect to a memory bus (with or without a memory controller), a peripheral bus, and a local bus using any of a variety of commercially available bus architectures.

The memory 320 includes a read-only memory (ROM) 320A, a random-access memory (RAM) 320B, a hard disk drive (HDD) 320C, and a database (DB) 320D. The memory 320 can provide nonvolatile storage of data, data structures, and computer-executable instructions, and can accommodate the storage of any data in a suitable digital format. The memory 320 can include a non-transitory computer-readable medium that can hold executable or interpretable computer code (or instructions) that, when executed by the processor 310, cause the steps, processes and methods in this disclosure to be carried out, including the method 200.

The computer-readable medium can be contained in the memory 320, and can include sections of computer code that, when executed by the processor 310, cause the controller 300 to: drive one or more robotic arms (not shown) to arrange and align the fastening portions 101 of the part 102 (shown in FIG. 1) with corresponding openings in the part 104; supply power to the horn 112 to operate a predetermined ultrasonic frequency, such as, for example, 50 kHz; and move the horn 112, as described above, including to form one or more stakes to fixedly join the parts 102 and 104 to each other.

A basic input-output system (BIOS) can be stored in the ROM 320A, which can include a non-volatile memory, an erasable programmable read-only memory (EPROM), or an electrically erasable programmable read-only memory (EEPROM). The BIOS can contain the basic routines that help to transfer instructions and data between any one or more of the components in the controller 400, such as during start-up.

The RAM 320B can include dynamic random-access memory (DRAM), a synchronous dynamic random-access memory (SDRAM), a static random-access memory (SRAM), a nonvolatile random-access memory (NVRAM), or another high-speed RAM for caching data.

The HDD 320C can include, for example, an enhanced integrated drive electronics (EIDE) drive, a serial advanced technology attachments (SATA) drive, or any suitable hard disk drive for use with big data. The HDD 320C can be configured for external use in a suitable chassis (not shown).

The DB 320D includes one or more databases, including one or more relational databases. The DB 320D can include detailed specifications of the part 102 and the part 104, including the location of each fastening portion 101 (including head 101H and body 101B) on the part 102 and the location of each corresponding opening in the part 104.

A computer program product can be tangibly embodied in a non-transitory computer-readable medium, which can be contained in the memory 320. The computer program product can contain instructions that, when executed by the processor 310, cause the processor 310 to perform one or more methods or operations, such as those included in this disclosure, including each step in the method 200.

The network interface 330 can be connected via a communication link to a network (not shown), which can include the Internet. The network interface 330 can include a wired or a wireless communication network interface (not shown) or a modem (not shown). The network interface 330 can include a receiver (not shown), a transmitter (not shown) or a transceiver (not shown). The network interface 330 can be configured to communicate with a computer (not shown) located external to, and remote from the apparatus, via a network.

The input-output (IO) interface 340 can receive commands or data from an operator via a user interface (not shown), such as, for example, a keyboard (not shown), a touch-display (not shown), a mouse (not shown), a pointer (not shown), a stylus (not shown), an interactive voice response (IVR) system (not shown), a microphone (not shown), a speaker (not shown), or a display device (not shown). The received commands and data can be forwarded from the IO interface 340 as instruction to data signals, via the bus 305, to any of the components in the controller 300.

The horn driver 350 includes a device or computer program that is configured to cause power to be supplied to the horn 112 such that the horn 112 generates ultrasonic energy at a predetermined frequency, such as 50 KHz.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

What is claimed is:

1. A method for ultrasonic staking a first part having a fastening portion that includes a flap-prone structure which resonates at frequencies of 40 kHz or less to a second part having an opening corresponding to the fastening portion, the method comprising:
   aligning the fastening portion that includes the flap-prone structure with the corresponding opening in the second part;
   inserting a head of the fastening portion that includes the flap-prone structure through the corresponding opening; and
   causing a horn of an ultrasonic staking stack to
   (i) contact the head,
   (ii) apply ultrasonic energy oscillating at a frequency between 45 kHz and 75 kHz without resonance disaster of the fastening portion that includes the flap-prone structure, and
   (iii) move along an axis of the fastening portion as the head melts to form a stake,
   wherein the stake comprises a melt-form that joins the first part and the second part to each other, and
   wherein the fastening portion that includes the flap-prone structure has a geometry or a size disposed to flapping at frequencies 40 kHz or less.

2. The method in claim 1, wherein inserting the head of the fastening potion through the corresponding opening comprises protruding the head of the fastening portion beyond a surface of the second part.

3. The method in claim 1, wherein the applied ultrasonic energy is oscillating at the frequency of 50 kHz.

4. The method in claim 3, further comprising, while causing the horn to apply the ultrasonic energy oscillating at the frequency of 50 kHz, simultaneously causing the horn to move along the axis of the fastening portion as the head melts.

5. The method in claim 1, wherein the size is a collapse length of between about 8 mm and about 25 mm.

6. The method in claim 1, wherein the fastening portion has a plurality of natural resonance frequencies of 40 kHz, or less.

7. The method in claim 1, wherein the geometry includes a base of the fastening portion that connects to the first part and has a first cross-section area that is substantially rectangular or trapezoidal in shape.

8. The method in claim 7, wherein the geometry includes a head of the fastening portion that has a second cross-section area smaller than said first cross-section area.

9. The method in claim 1, wherein the melt-form comprises a mushroom shape.

10. The method in claim 7, wherein the melt-form comprises a mushroom shape having a cross-section area that is substantially rectangular or trapezoidal in shape.

11. A non-transitory computer-readable medium for ultrasonic staking a first part having a fastening portion that includes a flap-prone structure which resonates at frequencies of 40 kHz or less to a second part having an opening corresponding to the fastening portion, the computer-readable medium comprising instructions that, when executed by a processor, cause the processor to perform a method comprising:
   aligning the fastening portion that includes the flap-prone structure with the corresponding opening in the second part;
   inserting a head of the fastening portion that includes the flap-prone structure through the corresponding opening; and
   causing a horn of an ultrasonic staking stack to
   (i) contact the head,
   (ii) apply ultrasonic energy oscillating at a frequency between 45 kHz and 75 kHz without resonance disaster of the fastening portion that includes the flap-prone structure, and
   (iii) move along an axis of the fastening portion as the head melts to form a stake,
   wherein the stake comprises a melt-form that joins the first part and the second part to each other, and
   wherein the fastening portion that includes the flap-prone structure has a geometry or a size disposed to flapping at frequencies 40 kHz or less.

12. The non-transitory computer-readable medium in claim 11, wherein the applied ultrasonic energy is oscillating at the frequency of 50 KHz.

13. The non-transitory computer-readable medium in claim 12, wherein the method further comprises, while causing the horn to apply the ultrasonic energy oscillating at the frequency of 50 kHz, simultaneously causing the horn to move along the axis of the fastening portion as the head melts.

14. The non-transitory computer-readable medium in claim 11, wherein the fastening portion has a plurality of resonance frequencies of 40 kHz, or less.

15. The non-transitory computer-readable medium in claim 11, wherein the geometry includes a base of the fastening portion that connects to the first part and has a first cross-section area that is substantially rectangular or trapezoidal in shape.

16. The non-transitory computer-readable medium in claim 15, wherein the geometry includes a head of the fastening portion that has a second cross-section area smaller than said first cross-section area.

17. The non-transitory computer-readable medium in claim 16, wherein the melt-form comprises a mushroom shape having a cross-section area that is substantially rectangular or trapezoidal in shape.

18. A system for ultrasonic staking a first part having a fastening portion that includes a flap-prone structure which resonates at frequencies of 40 kHz or less to a second part having an opening corresponding to the fastening portion, the system comprising:
   a horn configured to apply ultrasonic energy at a predetermined frequency; and
   a controller configured to operate the horn, including to
   (i) position the horn to contact a head of the fastening portion that includes the flap-prone structure,
   (ii) apply ultrasonic energy oscillating to the horn at a frequency between 45 kHz and 75 kHz without resonance disaster of the fastening portion that includes the flap-prone structure, and
   (iii) move the horn along an axis of the fastening portion as the head melts to form a stake,
   wherein the stake comprises a melt-form that joins the first part and the second part to each other, and
   wherein the fastening portion that includes the flap-prone structure has a geometry or a size disposed to flapping at frequencies of 40 kHz or less.

19. The system in claim 18, wherein the fastening portion has a natural resonance frequency of 40 kHz, or less, and wherein the applied ultrasonic energy is oscillating at the frequency of 50 kHz.

20. The system in claim 18, wherein the processor, while causing the horn to apply the ultrasonic energy oscillating at the frequency of 50 kHz, simultaneously causes the horn to move along the axis of the fastening portion as the head melts.

\* \* \* \* \*